US012615064B2

(12) United States Patent
Beaudin et al.

(10) Patent No.: US 12,615,064 B2
(45) Date of Patent: Apr. 28, 2026

(54) RADIO FREQUENCY (RF) FRONT END TO SUPPORT VARIOUS SIMULTANEOUS, SYNCHRONOUS AND ASYNCHRONOUS COMMUNICATION MODES

(71) Applicant: QUALCOMM Incorporated, San Diego, CA (US)

(72) Inventors: Steve Andre Beaudin, Fremont, CA (US); Kenneth Marvin Gainey, Escondido, CA (US); Asaf Doron, Shoham (IL); Andrew Friefeld, Scotts Valley, CA (US); Javier Del Prado Pavon, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 630 days.

(21) Appl. No.: 17/940,924

(22) Filed: Sep. 8, 2022

(65) Prior Publication Data

US 2023/0077767 A1 Mar. 16, 2023

Related U.S. Application Data

(60) Provisional application No. 63/243,577, filed on Sep. 13, 2021.

(51) Int. Cl.
*H04B 1/00* (2006.01)
*H04B 7/0413* (2017.01)

(52) U.S. Cl.
CPC .......... *H04B 1/006* (2013.01); *H04B 1/0057* (2013.01); *H04B 7/0413* (2013.01)

(58) Field of Classification Search
CPC ........ H04B 1/0057; H04B 1/40; H04B 1/401; H04B 1/006; H04B 7/0413; H04B 1/005;
(Continued)

(56) References Cited

U.S. PATENT DOCUMENTS 9,331,835 B1 5/2016 Lee et al.
10,284,244 B1 5/2019 Kulkarni et al.
(Continued)

FOREIGN PATENT DOCUMENTS

EP 2720378 A1 4/2014

OTHER PUBLICATIONS

International Search Report and Written Opinion—PCT/US2022/043020—ISA/EPO—Jan. 5, 2023.

*Primary Examiner* — Quoc Thai N Vu
(74) *Attorney, Agent, or Firm* — Loza & Loza LLP

(57) ABSTRACT

The apparatus includes a first xPlexer, coupled to a first antenna, including first and second filters; a second xPlexer, coupled to a second antenna, including third and fourth filters; a first switched xPlexer including fifth and sixth filters coupled to the second filter of the first xPlexer; a second switched xPlexer including seventh and eighth filters coupled to the fourth filter of the second xPlexer; a first transceiver coupled to the first filter of the first xPlexer and selectively coupled to the fifth filter of the first switched xPlexer; a second transceiver coupled to the third filter of the second xPlexer and selectively coupled to the seventh filter of the second switched xPlexer; a third transceiver selectively coupled to either the fifth or sixth filter of the first switched xPlexer; and a fourth transceiver selectively coupled to the seventh or eighth filter of the second switched xPlexer.

32 Claims, 13 Drawing Sheets

(58) Field of Classification Search
    CPC ... H04B 1/44; H04B 1/04; H04B 1/48; H04B
           1/50; H04B 1/52; H04B 1/0064; H04B
           7/04; H04B 7/0825; H04B 7/12; H04W
                         84/12
    See application file for complete search history.

(56)                 References Cited

U.S. PATENT DOCUMENTS

| | | | |
|---|---|---|---|
| 2015/0036656 A1* | 2/2015 | McCarthy | H04B 7/0689 |
| | | | 370/331 |
| 2021/0099205 A1 | 4/2021 | Seyed | |
| 2021/0250070 A1* | 8/2021 | Pyen | H04B 7/0817 |

* cited by examiner

300

400

RADIO FREQUENCY (RF) FRONT END TO SUPPORT VARIOUS SIMULTANEOUS, SYNCHRONOUS AND ASYNCHRONOUS COMMUNICATION MODES

CROSS-REFERENCE TO RELATED APPLICATION

This application claims the benefit of the filing date of U.S. Provisional Application, Ser. No. 63/243,577, filed on Sep. 13, 2021, which is incorporated herein by reference.

FIELD

Aspects of the present disclosure relate generally to radio frequency (RF) transceivers, and in particular, to an RF front end to support various simultaneous, synchronous and asynchronous communication modes, such as single band simultaneous (SBS), dual band simultaneous (DBS), synchronous multi-link operation (MLO), asynchronous MLO, and others as described herein.

BACKGROUND

A wireless communication device may transmit radio frequency (RF) signals to one or more remote wireless communication devices via different communication modes. For example, in a dual band simultaneous (DBS) mode, the wireless communication device transmits RF spatial multiple-input-multiple-output (MIMO) streams to one or more remote wireless communication devices, wherein the streams are in different bands (e.g., 2.4 gigaHertz (GHz) wireless local area network (WLAN) or WiFi or Bluetooth band and 5 GHz or 5 GHz combined with 6 GHz WLAN or WiFi band). In single band simultaneous (SBS) mode, the wireless communication device transmits RF spatial MIMO streams to one or more remote wireless communication devices with different sub-bands of the same band. In asynchronous multi-link operation (MLO) mode, there are asynchronous links (with respect to transmitting and receiving), in the same band, which generally requires isolation to protect a receiver from a transmit signal generated by an associated transmitter. An RF front end to facilitate such modes and others is provided herein.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

An aspect of the disclosure relates to an apparatus. The apparatus includes a first xPlexer including first and second filters, wherein the first xPlexer is configured to be coupled to a first antenna; a second xPlexer including third and fourth filters, wherein the second xPlexer is configured to be coupled to a second antenna; a first switched xPlexer including fifth and sixth filters coupled to the second filter of the first xPlexer; a second switched xPlexer including seventh and eighth filters coupled to the fourth filter of the second xPlexer; a first transceiver coupled to the first filter of the first xPlexer and selectively coupled to the fifth filter of the first switched xPlexer; a second transceiver coupled to the third filter of the second xPlexer and selectively coupled to the seventh filter of the second switched xPlexer; a third transceiver selectively coupled to either the fifth or sixth filter of the first switched xPlexer; and a fourth transceiver selectively coupled to the seventh or eighth filter of the second switched xPlexer.

Another aspect of the disclosure relates to an apparatus including a first switched diplexer including a first filter and a second filter; a second switched diplexer including a third filter and a fourth filter; a first transceiver selectively coupled to the first filter of the first switched diplexer; a second transceiver selectively coupled to the third filter of the second switched diplexer; a third transceiver selectively coupled to either the first filter or the second filter of the first switched diplexer; and a fourth transceiver selectively coupled to the third filter or the fourth filter of the second switched diplexer.

Another aspect of the disclosure relates to a method of operating a radio frequency (RF) front end. The method includes generating a first RF signal; generating a second RF signal; generating a third RF signal; generating a fourth RF signal; selectively routing the first RF signal to a first diplexer filter; selectively routing the third RF signal to the first diplexer filter or a second diplexer filter; selectively routing the third RF signal to a third diplexer filter; and selectively routing the fourth RF signal to the third diplexer filter or a fourth diplexer filter.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the description implementations are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
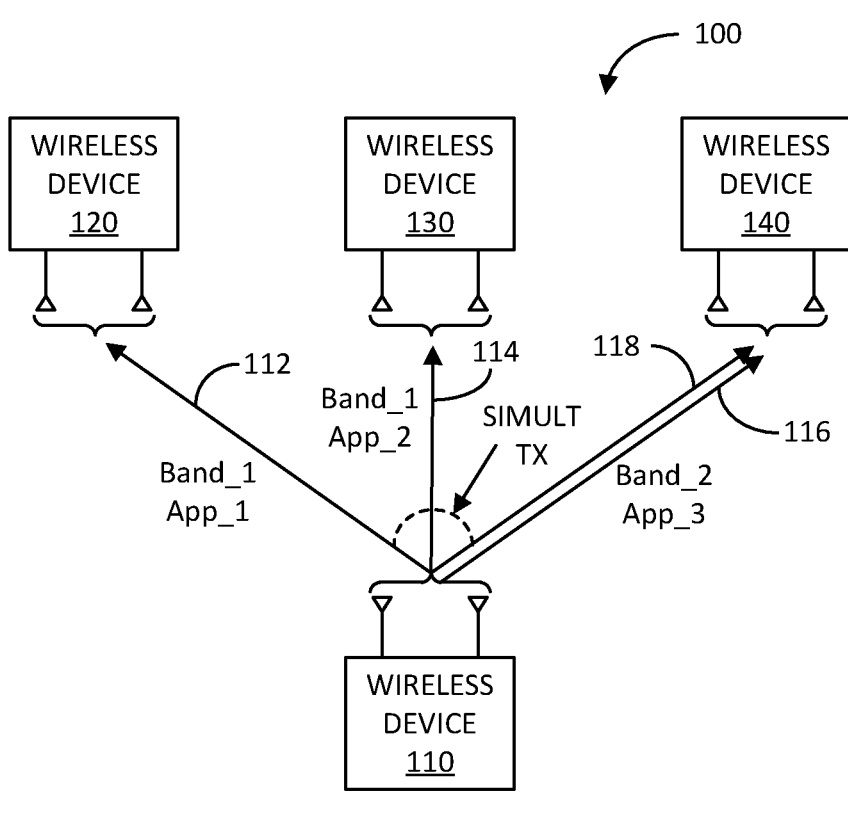
FIG. 1 illustrates a block diagram of an example wireless communication system in accordance with an aspect of the disclosure.

FIG. 1 illustrates a block diagram of an example wireless communication system 100 in accordance with an aspect of the disclosure. In this example, the wireless communication system 100 primarily facilitates wireless communications in accordance with wireless local area network (WLAN) or WiFi family of protocols, such as those specified by the Institute of Electrical and Electronics Engineer (IEEE) 802.11 standards. As discussed further herein, the wireless communication system 100 may also facilitate wireless communications in accordance with Bluetooth and cellular or wireless wide area network (WWAN) protocols, such as Long Term Evolution (LTE) and New Radio Fifth Generation (NR 5G). Although the aforementioned protocols serve as examples to explain the concepts described herein, it shall be understood that the concepts described herein are not limited to such protocols.

The wireless communication system 100 includes wireless communication devices 110, 120, 130, and 140, which may be implemented as any type of wireless devices, such as, for example, an access point, a smart phone, a smart television, an Internet of Things (IoT) device, wireless earbuds, and a wireless router. In this example, the wireless device 110 serves as the signal transmitting device, and the other wireless devices 120, 130, and 140 serve as the signal receiving devices. It shall be understood that all of the wireless devices 110, 120, 130, and 140 may be capable of both transmitting and receiving signals. Further, in accordance with this example, the transmitting wireless device 110 has multiple antennas for multiple input multiple output (MIMO) or other signal communication operations. Similarly, the other wireless devices 120, 130, and 140 may also have multiple antennas, as illustrated.

As described herein, MIMO communications are used to exemplify the front ends described herein. However, it shall be understood that while MIMO streams/signals are discussed, it should be appreciated that the MIMO signals may sometimes be referred to simply as signals (either MIMO properties or not) and that the device can transmit "non-MIMO" signals in various other modes, and may have various attributes either for MIMO or otherwise (and sometimes there may be configurations/modes where only one antenna is being used, or a mode where non-MIMO band 1 signal is sent through one antenna and non-MIMO band 2 signal is sent through another antenna).

In this example, the wireless device 110 is wirelessly transmitting signals 112, 114, and 116/118 to wireless devices 120, 130, and 140 in accordance with a dual band simultaneous (DBS) mode, respectively. The term "simultaneous" means that the signals 112, 114, and 116/118 are scheduled for simultaneous transmission (in this example), reception, or transmission and reception, such as within a specified slot or communication time interval. The term "dual band" means that one or more of the signals transmitted are in a first band (e.g., a WiFi or Bluetooth 2.4 gigaHertz (GHz) band, which may be defined as extending from 2400 to 2483.5 megaHertz (MHz)) and one or more other signals transmitted are in a second band (e.g., a WiFi 5 GHz and/or 6 GHz band, which is defined as expending from 5150 to 5925 MHz if the second band is only the WiFi 5 GHz band, or from 5150 to 7125 MHz if the second band includes both the 5 and 6 GHz bands, which is treated as a single band or band group herein).

In accordance with the DBS transmission example, the wireless device 110 simultaneously transmits a first spatial MIMO stream signal 112 using a first carrier in Band_1 (e.g., the 2.4 GHz band) including data pertaining to a first application App_1 (e.g., a television control application) to the wireless device 120; a second spatial MIMO stream signal 114 using the first carrier in Band_1 including data pertaining to a second application App_2 (e.g., a home security system control application) to wireless device 130; and a pair of spatial MIMO stream signals 116 and 118 both using a second carrier in Band_2 (e.g., the 5 and/or 6 GHz band) including data pertaining to a third application App_3 (e.g., Internet data) to the wireless device 140.

Figure 2:
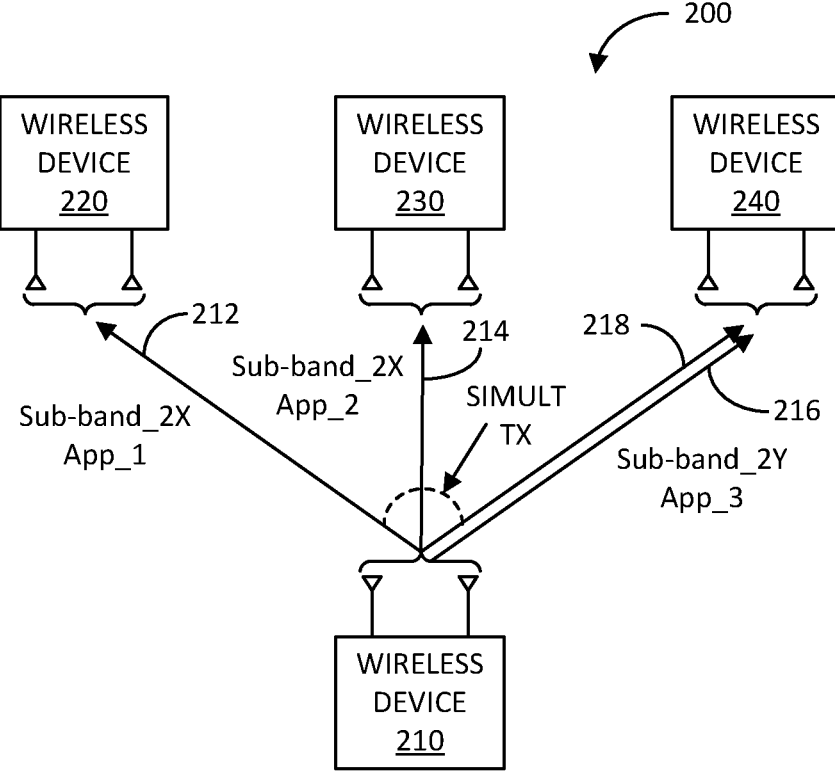
FIG. 2 illustrates a block diagram of another example wireless communication system in accordance with another aspect of the disclosure.

FIG. 2 illustrates a block diagram of another example wireless communication system 200 in accordance with another aspect of the disclosure. The wireless communication system 200 is similar to that of wireless communication system 100 previously discussed, including wireless communication devices 210, 220, 230, and 240. And, similar to wireless communication system 100, the wireless communication system 200 may also facilitate wireless communications in accordance with any of the WiFi, Bluetooth, cellular, WWAN, and/or other protocols. Also similarly, in this example, the wireless device 210 serves as the transmitting device, and the wireless devices 220, 230, and 240 serve as the receiving devices.

In this example, the wireless device 210 is wirelessly transmitting signals 212, 214, and 216/118 to wireless devices 220, 230, and 240 in accordance with a single band simultaneous (SBS) mode, respectively. Similarly, the term "simultaneous" means that the signals 212, 214, and 216/218 are scheduled for simultaneous transmission (in this example), reception, or transmission and reception, such as within a specified slot or communication time interval. The term "single band" means that one or more of the signals transmitted use a first carrier in a first sub-band of a particular band (e.g., a WiFi 5 GHz and/or 6 GHz band), and one or more of the other signals transmitted use a second carrier in a second sub-band of the same band.

For example, the WiFi 5 GHz band includes sub-bands identified as Unlicensed National Information Infrastructure (UNII)-1, -2A, -2B, -2C, -3, and -4. For example, sub-band UNII-1 extends from 5150 to 5250 MHz, UNII-2A sub-band extends from 5250 to 5350 MHz, sub-band UNII-2B extends from 5350 to 5470 MHz, sub-band UNII-2C extends from 5470 to 5725 MHz, sub-band UNII-3 extends from 5725 to 5850 MHz, and sub-band UNII-4 extends from 5850 to 5925 MHz. If the band is the combined WiFi 5-6 GHz band, the band further includes UNII-5, -6, -7, and -8. For example, UNII-5 extends from 5925 to 6425 MHz, UNII-6 sub-band extends from 6425 to 6525 MHz, sub-band UNII-7 extends from 6525 to 6875 MHz, and sub-band UNII-8 extends from 6875 to 7125 MHz.

In accordance with the SBS transmission example, the wireless device 210 simultaneously transmits a first spatial MIMO stream signal 212 using a first carrier in sub-band_2X (e.g., UNII-1 sub-band) including data pertaining to a first application App_1 (e.g., a television control application) to the wireless device 220; a second spatial MIMO stream signal 214 using the first carrier in sub-band_2X including data pertaining to a second application App_2 (e.g., a home security system control application) to wireless device 230; and a pair of spatial MIMO stream signals 216 and 218 using a second carrier in sub-band_2Y (e.g., UNII-5) including data pertaining to a third application App_3 (e.g., Internet data) to the wireless device 240.

Figure 3:
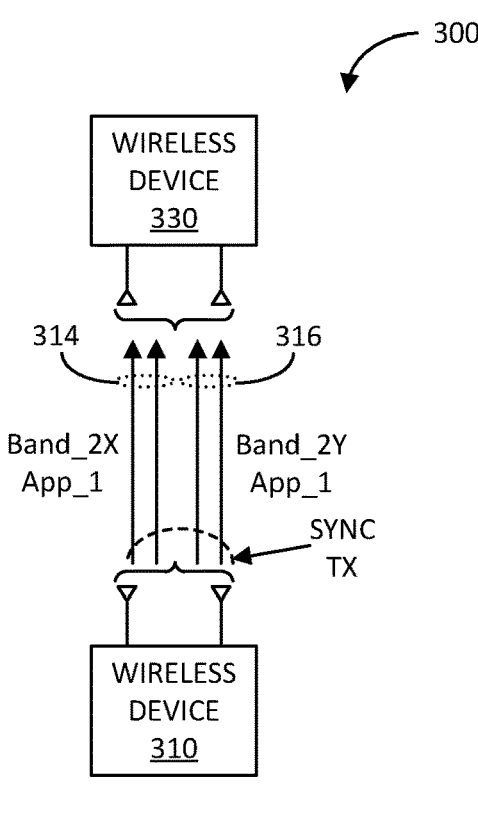
FIG. 3 illustrates a block diagram of another example wireless communication system in accordance with another aspect of the disclosure.

FIG. 3 illustrates a block diagram of another example wireless communication system 300 in accordance with another aspect of the disclosure. The wireless communication system 300 is similar to that of wireless communication system 100 or 200 previously discussed, including wireless communication devices 310 and 330. Similar to wireless communication system 100 or 200, the wireless communication system 300 may facilitate wireless communications in accordance with any of the WiFi, Bluetooth, cellular, WWAN, and/or other protocols. Also similarly, the wireless device 310 serves as the transmitting device, and the wireless device 330 serves as the receiving device.

In this example, the wireless device 310 is wirelessly transmitting two pairs of spatial streams 314 and 316 to wireless device 330 in accordance with a synchronous multi-link operation (MLO) mode. Similarly, the term "synchronous" means that the transmission of the signals 314 and 316 are scheduled for synchronous transmission, such as transmissions within a specified slot or transmission interval. The term "multi-link operation" or MLO means data pertaining to the same application is transmitted to another device via separate links or streams. As there are more than one link or stream, higher data throughput and lower latency may be achieved with synchronous MLO. Further, if one of the links or streams is compromised due to noise, interference, or other factors, the uncompromised link or stream is still available through which data transmission may take place; thereby, improving the reliability of the data transmission between two devices.

In accordance with the synchronous MLO transmission example, the wireless device 310 simultaneously transmits the first pair of spatial MIMO stream signals 314 using the same first carrier in sub-band_2X (e.g., UNII-1 sub-band) including data pertaining to application App_1 (e.g., multimedia streaming data) to the wireless device 330; and the second pair of spatial MIMO stream signals 316 using the same second carrier in sub-band_2Y (e.g., UNII-5) including data also pertaining to application App_1 to the wireless device 330.

Figure 4:
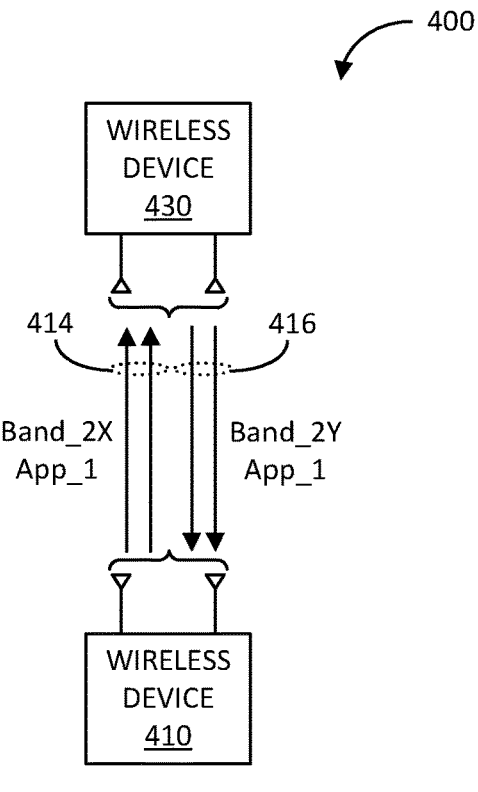
FIG. 4 illustrates a block diagram of another example wireless communication system in accordance with another aspect of the disclosure.

FIG. 4 illustrates a block diagram of another example wireless communication system 400 in accordance with another aspect of the disclosure. The wireless communication system 400 is similar to that of wireless communication system 300 previously discussed, including wireless communication devices 410 and 430. Similar to wireless communication system 300, the wireless communication system 400 may facilitate wireless communications in accordance with any of the WiFi, Bluetooth, cellular, WWAN, and/or other protocols. As discussed further herein, both wireless devices 410 and 430 serve as transmitting and receiving devices.

In this example, the wireless device 410 is wirelessly transmitting a pair of spatial streams 414 to wireless device 430 in accordance with an asynchronous multi-link operation (MLO) mode, and wirelessly receiving another pair of spatial streams 416 in accordance with the asynchronous MLO mode. The term "asynchronous" means that the transmission of the signals 414 and reception of the signals 416 need not be synchronous. This means that wireless device 410 may transmit the signals 414 and receive the signals 416 simultaneously (e.g., in the same slot or time interval) or not simultaneously (e.g., in different slots or time intervals). Similarly, the term "multi-link operation" or MLO means data pertaining to the same application is transmitted to and received from another device via separate links or streams.

In accordance with the asynchronous MLO transmission example, the wireless device 410 transmits the first pair of spatial MIMO stream signals 414 using the same first carrier in sub-band_2X (e.g., UNII-1 sub-band) including data pertaining to application App_1 (e.g., multimedia streaming data) to the wireless device 430; and receives the second pair of spatial MIMO stream signals 416 using the same second carrier in sub-band_2Y (e.g., UNII-5) including data also pertaining to application App_1 from the wireless device 430.

Figure 5:
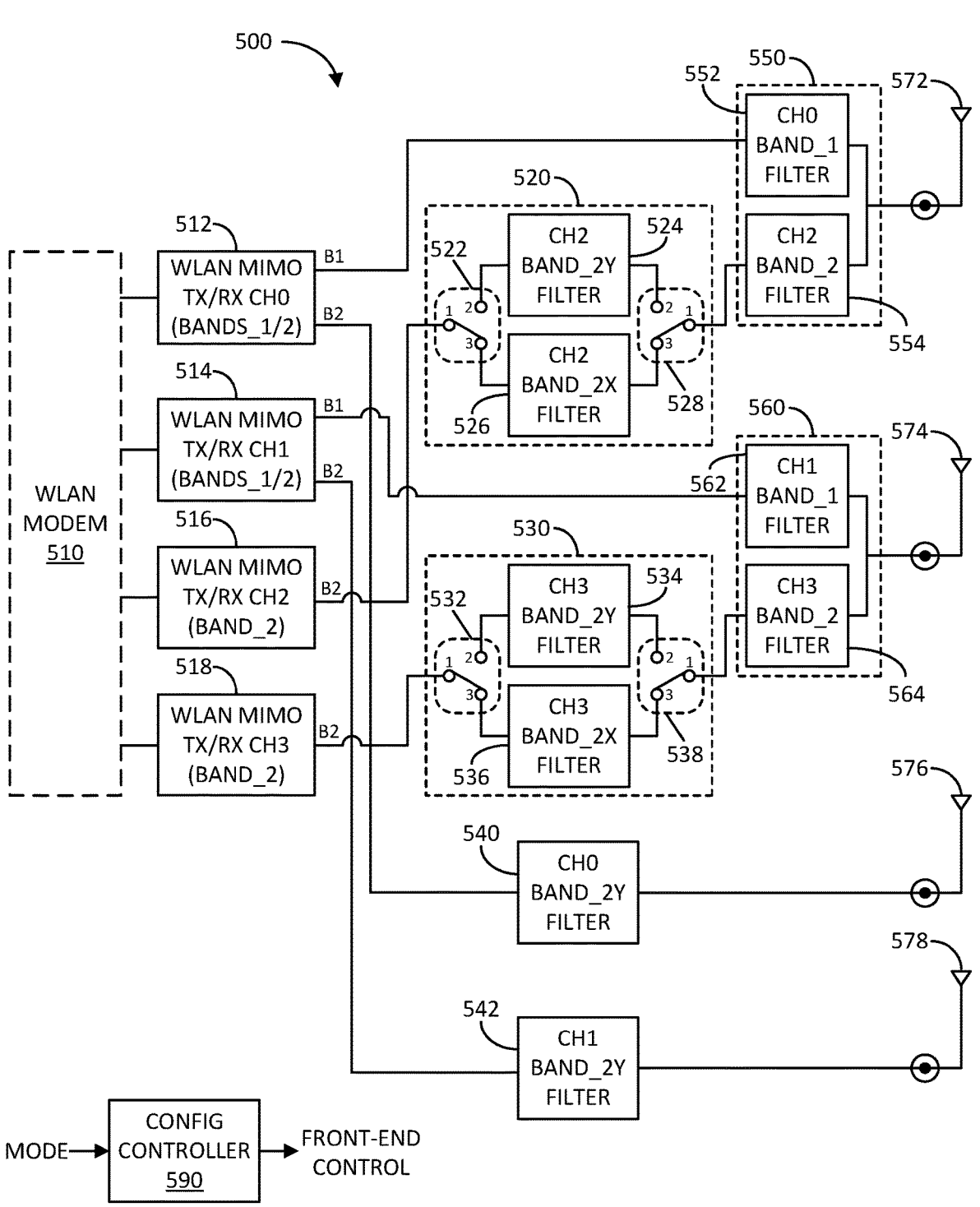
FIG. 5 illustrates a block diagram of an example radio frequency (RF) front end in accordance with another aspect of the disclosure.

FIG. 5 illustrates a block diagram of an example radio frequency (RF) front end 500 in accordance with another aspect of the disclosure. Any of the wireless communication devices previously discussed may include the RF front end 500 to implement the various modes of operation (e.g., DBS, SBS, synchronous MLO, and asynchronous MLO) previously discussed.

The RF front end 500 includes a set of MIMO transceivers 512, 514, 516, and 518 (that each may be configured to support MIMO communications), a pair of switched filter banks 520 and 530, a pair of fixed (but could also be switched) diplexers 550 and 560, and a pair of standalone filters 540 and 542. A transceiver, as defined herein, is a transceiver circuit with at least one transmit path/circuit and at least one receive path/circuit, where the transceiver is configured for conditioning transmit and receive signals in certain frequency ranges (e.g., for different sub-bands). A filter, as described herein, is configured to have a passband (e.g., a three (3) decibel (dB) passband) associated with a frequency band or sub-band of an RF signal.

The RF front end 500 may be coupled to a wireless local area network (WLAN) or WiFi modem 510, and four (4) antennas 572, 574, 576, and 578. However, as discussed, the modem 510 may be a cellular, WWAN, or compliant with other communication protocol modem. The RF front end 500 may include a configuration controller 590 to configure the set of WLAN MIMO transceivers 512, 514, 516, and 518 and the switched filter banks 520 and 530 to implement any one of the modes of operation previously discussed. Again, the MIMO transceivers 512, 514, 516, and 518 may be compliant with any of a number of wireless communication protocols.

More specifically, the set of WLAN MIMO transceivers 512, 514, 516, and 518 include a set of signal ports coupled to the WLAN modem 510. Via the signal ports, the set of WLAN MIMO transceivers 512, 514, 516, and 518 are able to receive transmit (Tx) baseband (BB) signals from the WLAN modem 510, respectively. Also, via the signal ports, the set of WLAN MIMO transceivers 512, 514, 516, and 518 are able to provide received (Rx) baseband signals to the WLAN modem 510, respectively.

With regard to transmission, the set of WLAN MIMO transceivers 512, 514, 516, and 518 are configured to generate transmit (Tx) RF signals based on the Tx BB signals received from the WLAN modem 510, respectively. As discussed further herein, the transmission processing performed by each WLAN MIMO transceivers 512, 514, 516, and 518 may include converting the Tx BB signals from digital to analog, frequency upconverting the analog Tx BB signals to generate RF signals, spatial phase-shifting and amplifying, and power amplifying the RF signals to generate the Tx RF signals.

With regard to reception, the set of WLAN MIMO transceivers 512, 514, 516, and 518 are configured to generate received (Rx) BB signals based on Rx RF signals from remote wireless device(s), respectively. As discussed further herein, the reception processing performed by each WLAN MIMO transceivers 512, 514, 516, and 518 may include low noise amplifying the Rx RF signals, spatial phase-shifting and amplifying, frequency down-converting, and analog to digital conversion to generate the Rx BB signals.

In this example, the WLAN MIMO transceivers 512 and 514 may be configured to perform 2×2 MIMO processing in a selected band1 (e.g., 2.4 GHz band) or band_2 (e.g., the 5 and/or 6 GHz band). The WLAN MIMO transceivers 512 and 514 may be associated with chains 0 and 1, respectively. The WLAN MIMO transceivers 516 and 518 may be configured to perform 2×2 MIMO processing in band_2. The WLAN MIMO transceivers 516 and 518 may be associated with chains 2 and 3, respectively.

Accordingly, in this example, the WLAN MIMO transceivers 516 and 518 may be the main chains 2/3 for band_2, and able to transmit and receive signals across any of the sub-bands in band_2 (e.g., UNII-1 to UNII-4 (5 GHz) or UNII-1 to UNII-8 (5/6 GHz)). The WLAN MIMO transceivers 512 and 514 may be the main chains 0/1 for band1, and able to transmit and receive signals across any sub-bands in band1. With regard to band_2, the WLAN MIMO transceivers 512 and 514 may be able to transmit and receive signals via a selected one of a subset of the sub-bands of band_2 (e.g., sub-bands UNII-1 or -2A), while WLAN MIMO transceivers 516 and 518 transmit and receive signals via a selected one of another subset of sub-bands of band_2 (e.g., sub-bands UNII-2C to UNII-8) in SBS and MLO modes.

The WLAN MIMO transceivers 512 and 514 each include a port for transmitting or receiving Tx or Rx RF signals in the band1 (the port being identified as "B1"). Also, the WLAN MIMO transceivers 512 and 514 each include the same or another port for transmitting or receiving Tx or Rx RF signals in the band_2 (the port being identified as "B2" separate from port "B1" to facilitate explanation). The WLAN MIMO transceivers 516 and 518 each include a port for transmitting or receiving Tx or Rx RF signals in the band_2 (the port being identified as "B2").

The switched filter bank 520 includes a first single pole double throw (SPDT) switch 522, a sub-band 2Y filter 524 for chain 2 (e.g., passes signals within UNII-2C to -8 (e.g., insertion loss of 1-2 or less decibels (dBs)), and rejects signals in UNII-1 and -2A) (e.g., insertion loss of 45 or more dBs), a sub-band 2X filter 526 for chain 2 (e.g., passes signals within UNII-1 to -2A (e.g., insertion loss of 1-2 or less dBs), and rejects signals in UNII-2C to -8) (e.g., insertion loss of 45 or more dBs), and a second SPDT switch 528.

The first SPDT switch 522 includes a pole (labeled as "1") coupled to the B2 port of the chain 2 WLAN MIMO transceiver 516; a first throw (labeled as "2") coupled to the chain 2 sub-band 2Y filter 524; and a second throw (labeled as "3") coupled to the chain 2 sub-band 2X filter 526. The second SPDT switch 528 includes a pole (labeled as "1") coupled to a band_2 filter for chain 2 of diplexer 550; a first throw (labeled as "2") coupled to the chain 2 sub-band 2Y filter 524; and a second throw (labeled as "3") coupled to the chain 2 sub-band 2X filter 526. As the filters 524 and 526 may need to separate sub-bands, which may be relatively close in frequency, the switched filter bank 520 may be implemented using relatively high-Q filter technology, such as bulk acoustic wave (BAW), or any other technology which allows a filter with the appropriate pass band and rejection band to be realized, such as film bulk acoustic wave (FBAR), BAW-XBAR, surface acoustic wave (SAW), temperature-compensated SAW (TC-SAW), dielectric resonators, ceramic filter, or other similar technology.

The switched filter bank 530 includes a first SPDT switch 532, a sub-band 2Y filter 534 for chain 3 (e.g., passes signals within UNII-2C to -8 (e.g., insertion loss of 1-2 or less dBs), and rejects signals in UNII-1 and 2A (e.g., insertion loss of 45 or more dBs)), a sub-band 2X filter 536 for chain 3 (e.g., passes signals within UNII-1 to -2A (e.g., insertion loss of 1-2 or less dBs), and rejects signals in UNII-2C to -8 (e.g., insertion loss of 45 or more dBs)), and a second SPDT switch 538.

The first SPDT switch 532 includes a pole (labeled as "1") coupled to the B2 port of the chain 3 WLAN MIMO transceiver 518; a first throw (labeled as "2") coupled to the chain 3 sub-band 2Y filter 534; and a second throw (labeled as "3") coupled to the chain 3 sub-band 2X filter 536. The second SPDT switch 538 includes a pole (labeled as "1") coupled to a band_2 filter for chain 3 of diplexer 560; a first throw (labeled as "2") coupled to the chain 3 sub-band 2Y filter 534; and a second throw (labeled as "3") coupled to the chain 3 sub-band 2X filter 536. Similarly, as the filters 534 and 536 may need to separate sub-bands, which may be relatively close in frequency, the switched filter bank 530 may be implemented using relatively high-Q filter technology, such as BAW or other similar technology.

The diplexer 550 includes a band1 filter 552 for chain 0 coupled to the B1 port of the chain 0 WLAN MIMO transceiver 512. The chain 0 band1 filter 552 and chain 2 band_2 filter 554 include respective ports coupled together, and to the antenna 572. The chain 0 band1 filter 552 is configured to pass signals within band1 (e.g., the 2.4 GHz band) and reject signals within band_2 (e.g., the 5 and/or 6 GHz band). The chain 2 band_2 filter 554 is configured to pass signals within band_2 (e.g., the 5 and/or 6 GHz band) and reject signals within band1 (e.g., the 2.4 GHz band). As the filters 552 and 554 may need to separate different bands, which may be relatively far apart in frequency, the diplexer 550 may be implemented using lower Q filter technology compared to switched filter bank 520; for example, implemented using low temperature co-fired ceramic (LTCC), passive on glass (POG) technology, surface acoustic wave (SAW) or other similar technology.

Although diplexers 550 and 560 are shown as diplexers, with a 2.4 GHz and a UNII 1-8 passband in this diagram, these diplexers could also be triplexers or quadplexers, where a 3$^{rd}$ or 4$^{th}$ frequency band is combined through the same triplexer or quadplexer onto the same antenna. Typical examples of this would be a triplexer which supports the Global Navigation Satellite System (GNSS) band, as well as the 2.4 GHz and UNII 1-8 bands on separate ports. An example of a quadplexer may be a Long Term Evolution (LTE) Low Band, GNSS, 2.4 GHz and UNII 1-8, all coupled to different ports of the same quadplexer to allow them to share the same antenna. A triplexer or quadplexer can be used on either or both of the antennas, in lieu of diplexers 550 or 560. Generally, any diplexer described herein could generally be an xPlexer, where x represents two (2) or more filters.

The diplexer 560 includes a band1 filter 562 for chain 1 coupled to the B1 port of the chain 1 WLAN MIMO transceiver 514. The chain 1 band1 filter 562 and chain 3 band_2 filter 564 include respective ports coupled together, and to the antenna 574. The chain 1 band1 filter 562 is configured to pass signals within band1 (e.g., the 2.4 GHz band) and reject signals within band_2 (e.g., the 5 and/or 6 GHz band). The chain 3 band_2 filter 564 is configured to pass signals within band_2 (e.g., the 5 and/or 6 GHz band) and reject signals within band1 (e.g., the 2.4 GHz band). Similarly, as the filters 562 and 564 may need to separate different bands, which may be relatively far apart in frequency, the diplexer 560 may be implemented with lower Q technology compared to switched filter bank 530; for example, implemented using LTCC, POG, SAW or other similar technology.

The chain 0 band_2Y filter 540 is coupled to the B2 port of the chain 0 WLAN MIMO transceiver 512, and coupled to the antenna 576. The chain 1 band_2Y filter 542 is coupled to the B2 port of the chain 1 WLAN MIMO transceiver 514, and coupled to the antenna 578. Both of these filters 540 and 542 are configured to pass signals within the sub-band 2Y (e.g., UNII-2C to -8 (e.g., insertion loss of 1-2 or less dBs)), and reject signals in sub-band 2X (e.g., UNII-1 and -2A (e.g., insertion loss of 45 or more dBs)).

In accordance with a DBS mode of operation as discussed with reference to wireless communication system 100, the configuration controller 590 configures the chains 0/1 WLAN MIMO transceivers 512 and 514 to generate band1 RF Tx MIMO signals (e.g., 2.4 GHz band) for effectuating the spatial streams 112 and 114 for data transmissions to wireless devices 120 and 130, respectively. Simultaneously, the configuration controller 590 configures the chains 2/3 WLAN MIMO transceivers 516 and 518 to generate band_2 RF Tx MIMO signals (e.g., 5 and/or 6 GHz band) for effectuating the spatial streams 116 and 118 for data transmission to wireless device 140.

If the RF Tx MIMO signals generated by the WLAN MIMO transceivers 516 and 518 are in sub-band 2X (e.g., UNII-1 or -2A), the configuration controller 590 configures the SPDT switches 522/528 and 532/538 of the switched filter banks 520 and 530 to couple the poles "1" to the throws "3", respectively. In this configuration, the chains 0/1 band1 RF Tx MIMO signals are sent to the antennas 572 and 574 through chains 0/1 band1 filters 552 and 562 of diplexers 550 and 560, respectively; and the chains 2/3 band_2 RF Tx MIMO signals are sent to the antennas 572 and 574 through chains 2/3 band_2X filters 526 and 536 of switched filter banks 520 and 530 and chains 2/3 band_2 filters 554 and 564 of diplexers 550 and 560, respectively.

If the RF Tx MIMO signals generated by the WLAN MIMO transceivers 516 and 518 are in sub-band 2Y (e.g., UNII-2C to -8), the configuration controller 590 configures the SPDT switches 522/528 and 532/538 of the switched filter banks 520 and 530 to couple the poles "1" to the throws "2", respectively. In this configuration, the chains 0/1 band1 RF Tx MIMO signals are sent to the antennas 572 and 574 through chains 0/1 band1 filters 552 and 562 of diplexers 550 and 560, respectively; and the chains 2/3 band_2 RF Tx MIMO signals are sent to the antennas 572 and 574 through chains 2/3 band_2Y filters 524 and 534 of switched filter banks 520 and 530 and chains 2/3 band_2 filters 554 and 564 of diplexers 550 and 560, respectively.

In accordance with an SBS mode of operation as discussed with reference to wireless communication system 200, the configuration controller 590 configures the chains 0/1 WLAN MIMO transceivers 512 and 514 to generate sub-band_2Y RF Tx MIMO signals (e.g., one of sub-band UNII-2C to -8 of the 5 and/or 6 GHz band) for effectuating the spatial streams 216 and 218 for data transmissions to wireless device 240.

Simultaneously, the configuration controller 590 configures the chains 2/3 WLAN MIMO transceivers 516 and 518 to generate sub-band_2X RF Tx MIMO signals (e.g., one of sub-band UNII-1 or -2A of the 5 and/or 6 GHz band) for effectuating the spatial streams 212 and 214 for data transmission to wireless devices 220 and 230, respectively.

Additionally, the configuration controller 590 configures the SPDT switches 522/528 and 532/538 of the switched filter banks 520 and 530 to couple the poles "1" to the throws "3", respectively. In this configuration, the chains 0/1 band1 RF Tx MIMO signals are sent to the antennas 576 and 578 through chains 0/1 band_2Y filters 540 and 542, respectively; and the chains 2/3 band1 RF Tx MIMO signals are sent to the antennas 572 and 574 through chains 2/3 band_2X filters 526 and 536 of switched filter banks 520 and 530 and chains 2/3 band_2 filters 554 and 564 of diplexers 550 and 560, respectively.

In accordance with synchronous MLO mode of operation as discussed with reference to wireless communication system 300, the configuration controller 590 configures the front end similar to that of SBS mode to generate the spatial streams 314 and 316 for data transmission to the wireless device 330. In accordance with asynchronous MLO operation as discussed with reference to wireless communication system 400, the configuration controller 590 configures the front end similar to that of SBS mode to generate the spatial streams 414 for data transmission to the wireless device 430, with the exception that chains 0/1 WLAN MIMO transceivers 512 and 514 may optionally be configured to receive RF signals 416. Optionally, in asynchronous MLO operation, the configuration controller 590 may configure the chains 0/1 WLAN MIMO transceivers 512 and 514 for transmission, and the chains 2/3 WLAN MIMO transceivers 516 and 518 for reception.

One feature of the RF front end 500 is that it includes four (4) antennas used for the WLAN operation. For small form factor devices, such as smart phones and other similar devices (or devices in general where cost or other factors may support a desire for fewer antennas), implementing four (4) antennas in such a device may be difficult or not as practical/desirable. Accordingly, it may be desirable to implement all the modes of operation previously discussed with a front end having less than four (4) antennas, such as one having two (2) antennas, for example. The following describes alternative RF front ends having such attributes.

Figure 6A:
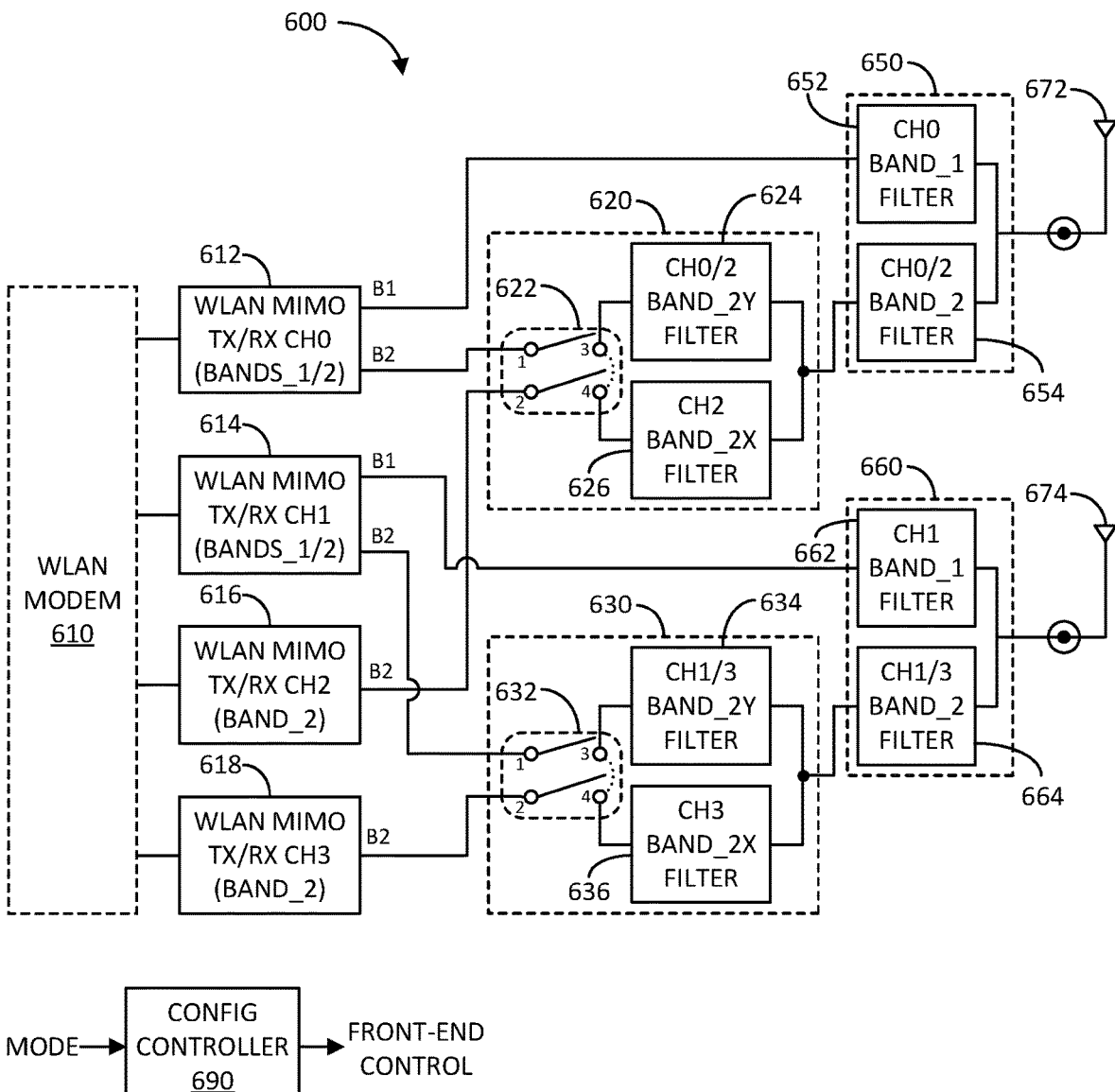
FIG. 6A illustrates a block diagram of another example radio frequency (RF) front end in accordance with another aspect of the disclosure.

FIG. 6A illustrates a block diagram of another example radio frequency (RF) front end 600 in accordance with another aspect of the disclosure. The front end 600 includes switched diplexers 620 and 630 (or more generally, switched xPlexers) configured to allow various modes of operation (e.g., DBS, SBS, synchronous MLO, and asynchronous MLO) to be implemented using two antennas instead of four.

In particular, the front end 600 includes chains 0/1 WLAN (or other wireless communication protocol) MIMO transceivers 612 and 614, chains 2/3 WLAN (or other wireless communication protocol) MIMO transceivers 616 and 618, diplexers 650 and 660 including chains 0/1 band1 filters 652 and 662 and chains 0/2 and 1/3 band_2 filters 654 and 664, and a configuration controller 690. These elements of front end 600 are similar to the corresponding ones of front end 500 previously discussed. Accordingly, the WLAN MIMO transceivers 612, 614, 616, and 618 are coupled to a WLAN (or other wireless communication protocol) modem 610, and the diplexers 650 and 660 are coupled to antennas 672 and 674, respectively. It shall be understood that diplexers 650 and 660 may be optional, and the outputs of the switched diplexers 620 and 630 may be coupled to the antennas 672 and 674, respectively. It shall be understood that additional switched diplexers may be added or the switched diplexers 620 and 630 may be configured to allow other signals to use the same antennas 672 and 674, such as ultrawide band (UWB) signals.

Although diplexers 650 and 660 are shown as diplexers, with a 2.4 GHz and a UNII 1-8 passband in this diagram, these diplexers could also be triplexers or quadplexers, where a $3^{rd}$ or $4^{th}$ frequency band is combined through the same triplexer or quadplexer onto the same antenna. Typical examples of this would be a triplexer which supports the Global Navigation Satellite System (GNSS) band, as well as the 2.4 GHz and UNII 1-8 bands on separate ports. An example of a quadplexer may be a Long Term Evolution (LTE) Low Band, GNSS, 2.4 GHz and UNII 1-8, all coupled to different ports of the same quadplexer to allow them to share the same antenna. A triplexer or quadplexer can be used on either or both of the antennas, in lieu of diplexers 650 or 660. Generally, any diplexer described herein could generally be an xPlexer, where x represents two (2) or more filters.

The switched diplexer 620 includes a half (½) double pole double throw (DPDT) switch 622, chains 0/2 sub-band_2Y filter 624, and a chain 2 sub-band 2X filter 626. The ½ DPDT switch 622 includes a first pole (labeled as "1") coupled to the B2 port of the chain 0 WLAN MIMO transceiver 612, a second pole (labeled as "2") coupled to the B2 port of chain 2 WLAN MIMO transceiver 616, a first throw (labeled as "3") coupled to the chains 0/2 sub-band_2Y filter 624, and a second throw (labeled as "4") coupled to the chain 2 sub-band 2X filter 626. The DPDT switch 622 is referred to being ½ because the first pole "1" may be selectively coupled to throw "3" but not throw "4", whereas the second pole "2" may be selectively coupled to both throws "3" and "4". It shall be understood that the terms pole and throw are interchangeable meaning two sides of a switch. As used herein, the poles are coupled to the transceivers and the throws are coupled to the filters of the diplexers. The filters 624 and 626 are coupled to the chain 0/2 band_2 filter 654 of diplexer 650. Similar to switched filter bank 520, the diplexer 620 may be implemented with relatively high-Q technology, such as BAW, or any other technology which allows a filter with the appropriate pass band and rejection band to be realized, such as film bulk acoustic wave (FBAR), BAW-XBAR, SAW, TC-SAW, dielectric resonator or ceramic filter.

The switched diplexer 630 includes a ½ DPDT switch 632, chains 1/3 sub-band_2Y filter 634, and a chain 3 sub-band 2X filter 636. The ½ DPDT switch 632 includes a first pole (labeled as "1") coupled to the B2 port of the chain 1 WLAN MIMO transceiver 614, a second pole (labeled as "2") coupled to the B2 port of chain 3 WLAN MIMO transceiver 618, a first throw (labeled as "3") coupled to the chains 1/3 sub-band_2Y filter 634, and a second throw (labeled as "4") coupled to the chain 3 sub-band 2X filter 636. The filters 634 and 636 are coupled to the chain 1/3 band_2 filter 664 of diplexer 660. Similar to switched filter bank 530, the diplexer 630 may be implemented with relatively high-Q technology, such as BAW. The half DPDT switch 622 and Diplexer 624/626 as well as ½ DPDT switch 632 and Diplexer 634/636 can be packaged as a single component, or separately as 2 components.

In accordance with a DBS mode of operation as discussed with reference to wireless communication system 100, the configuration controller 690 configures the chains 0/1 WLAN MIMO transceivers 612 and 614 to generate band1 RF Tx MIMO signals (e.g., 2.4 GHz band) for effectuating the spatial streams 112 and 114 for data transmissions to wireless devices 120 and 130, respectively. Simultaneously, the configuration controller 690 configures the chains 2/3 WLAN MIMO transceivers 616 and 618 to generate band_2 RF Tx MIMO signals (e.g., 5 and/or 6 GHz band) for effectuating the spatial streams 116 and 118 for data transmission to wireless device 140.

If the RF Tx MIMO signals generated by the WLAN MIMO transceivers 616 and 618 are in sub-band 2X (e.g., UNII-1 or -2A), the configuration controller 690 configures the ½ DPDT switches 622 and 632 of the switched diplexers 620 and 630 to couple the poles "2" to the throws "4", respectively. In this configuration, the chains 0/1 band1 RF Tx MIMO signals are sent to the antennas 672 and 674 through chains 0/1 band1 filters 652 and 662 of diplexers 650 and 660, respectively; and the chains 2/3 band_2 RF Tx MIMO signals are sent to the antennas 672 and 674 through chains 2/3 band_2X filters 626 and 636 of switched diplexers 620 and 630 and chains 0/2 and 1/3 band_2 filters 654 and 664 of diplexers 650 and 660, respectively.

If the RF Tx MIMO signals generated by the WLAN MIMO transceivers 616 and 618 are in sub-band 2Y (e.g., UNII-2C to -8), the configuration controller 690 configures the ½ DPDT switches 622 and 632 of the switched diplexers 620 and 630 to couple the poles "2" to the throws "3", respectively. In this configuration, the chains 0/1 band1 RF Tx MIMO signals are sent to the antennas 672 and 674 through chains 0/1 band1 filters 652 and 662 of diplexers 650 and 660, respectively; and the chains 2/3 band_2 RF Tx MIMO signals are sent to the antennas 672 and 674 through chains 0/2 and 1/3 band_2Y filters 624 and 634 of switched diplexers 620 and 630 and chains 0/2 and 1/3 band_2 filters 654 and 664 of diplexers 650 and 660, respectively. Note that in this configuration, the first pole "1" of the ½ DPDT switches 622 and 632 are not coupled to throws "2" and "3".

In accordance with an SBS mode of operation as discussed with reference to wireless communication system 200, the configuration controller 690 configures the chains 0/1 WLAN MIMO transceivers 612 and 614 to generate sub-band_2Y RF Tx MIMO signals (e.g., one of sub-band UNII-2C to -8 of the 5 and/or 6 GHz band) for effectuating the spatial streams 216 and 218 for data transmissions to wireless device 240.

Simultaneously, the configuration controller 690 configures the chains 2/3 WLAN MIMO transceivers 616 and 618 to generate sub-band_2X RF Tx MIMO signals (e.g., one of sub-band UNII-1 or -2A of the 5 and/or 6 GHz band) for effectuating the spatial streams 212 and 214 for data transmission to wireless devices 220 and 230, respectively.

Additionally, the configuration controller 690 configures the ½ DPDT switches 622 and 632 of the switched diplexers 620 and 630 to couple the poles "1" and "2" to the throws "3" and "4", respectively. In this configuration, the chains 0/1 band_2 RF Tx MIMO signals are sent to the antennas 672 and 674 through chains 0/2 and 1/3 band_2Y filters 624 and 634 of switched diplexers 620 and 630, and chains 0/2 and 1/3 band_2 filters 654 and 664 of diplexers 650 and 660, respectively; and the chains 2/3 band_2 RF Tx MIMO signals are sent to the antennas 672 and 674 through chains 2/3 band_2X filters 626 and 636 of switched diplexers 620 and 630 and chains 0/2 and 1/3 band_2 filters 654 and 664 of diplexers 650 and 660, respectively.

In accordance with synchronous MLO mode of operation as discussed with reference to wireless communication system 300, the configuration controller 690 configures the front end similar to that of SBS mode to generate the spatial streams 314 and 316 for data transmission to the wireless device 330. In accordance with asynchronous MLO operation as discussed with reference to wireless communication system 400, the configuration controller 690 configures the front end similar to that of SBS mode to generate the spatial streams 414 for data transmission to the wireless device 430, with the exception that chains 0/1 WLAN MIMO transceivers 612 and 614 may optionally be configured to receive RF signals 416. Optionally, in asynchronous MLO operation, the configuration controller 690 may configure the chains 0/1 WLAN MIMO transceivers 612 and 614 for transmission, and the chains 2/3 WLAN MIMO transceivers 616 and 618 for reception.

Figure 6B:
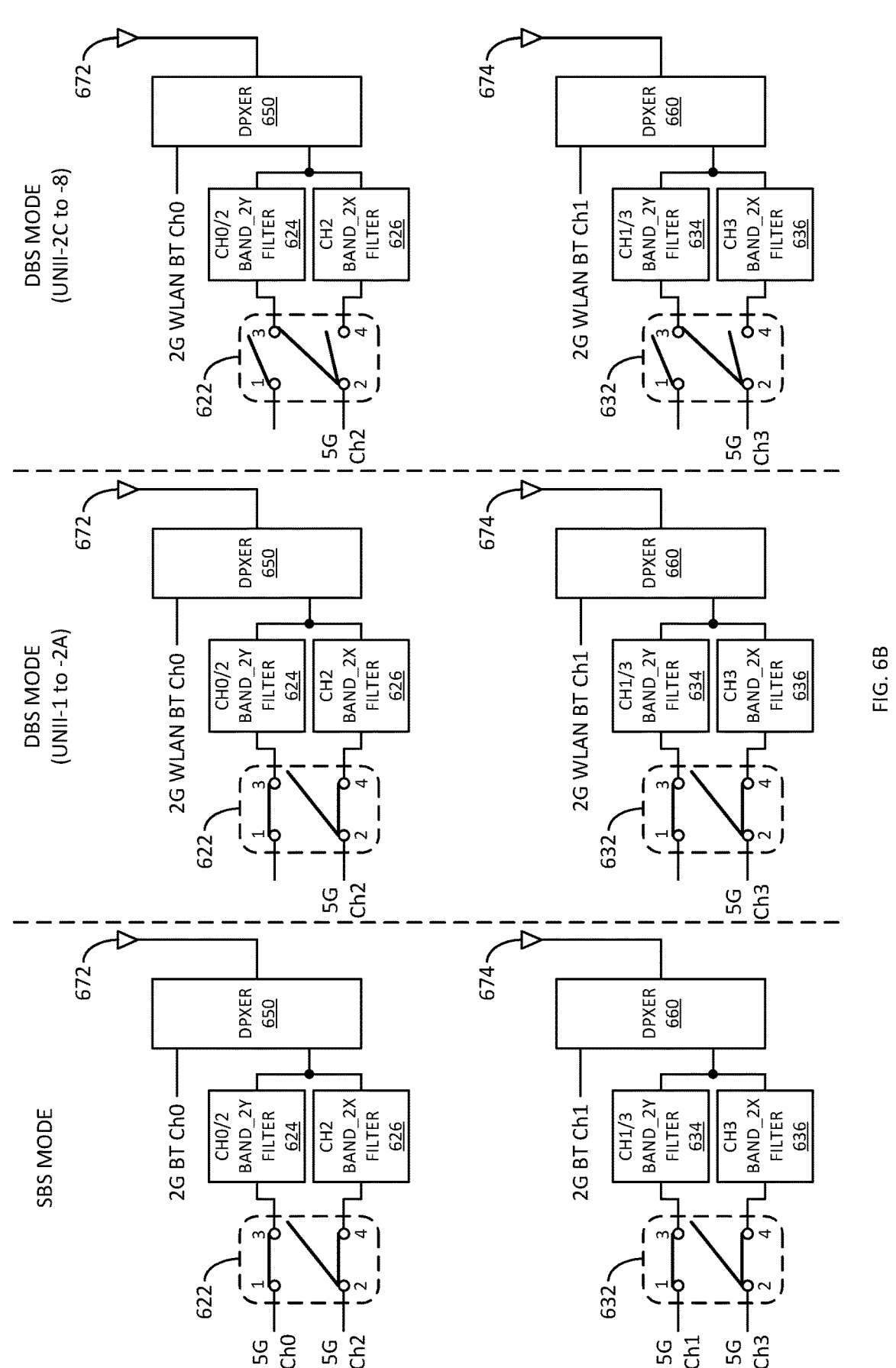
FIG. 6B illustrates various diagrams of portions of the RF front end of FIG. 6A in different configurations in accordance with another aspect of the disclosure.

FIG. 6B illustrates various diagrams of portions of the RF front end 600 in different configurations in accordance with another aspect of the disclosure. This figure depicts the states of the ½ DPDT switches 622 and 632 of the switched diplexers 620 and 630 in the SBS mode (left diagram), DBS mode where the 5 GHz band signals are sent via a lower sub-band UNII-1 or -2A (middle diagram), and DB S mode where the 5 and/or 6 GHz band signals are sent via an upper sub-band, one of UNII-2C to -8 (right diagram), as discussed above. That is, in SBS mode, the ½ DPDT switches 622 and 632 are configured to couple the poles "1" and "2" to the throws "3" and "4", respectively. Note that in SBS mode, Bluetooth (BT) MIMO signals may be provided to the diplexers 650 and 660 for effectuating simultaneous Bluetooth data communications. In DBS mode where the 5 GHz band signals are sent via a lower sub-band UNII-1 or -2A, the ½ DPDT switches 622 and 632 are configured to couple the poles "2" to the throws "4", respectively. And, in DBS mode where the 5 and/or 6 GHz band signals are sent via an upper sub-band, the ½ DPDT switches 622 and 632 are configured to couple the poles "2" to the throws "3", respectively. Note that in DBS mode, Bluetooth (BT) MIMO signals (instead of WLAN 2.4 GHz MIMO signals) may be provided to the diplexers 650 and 660 for effectuating simultaneous Bluetooth data communications.

Figure 7:
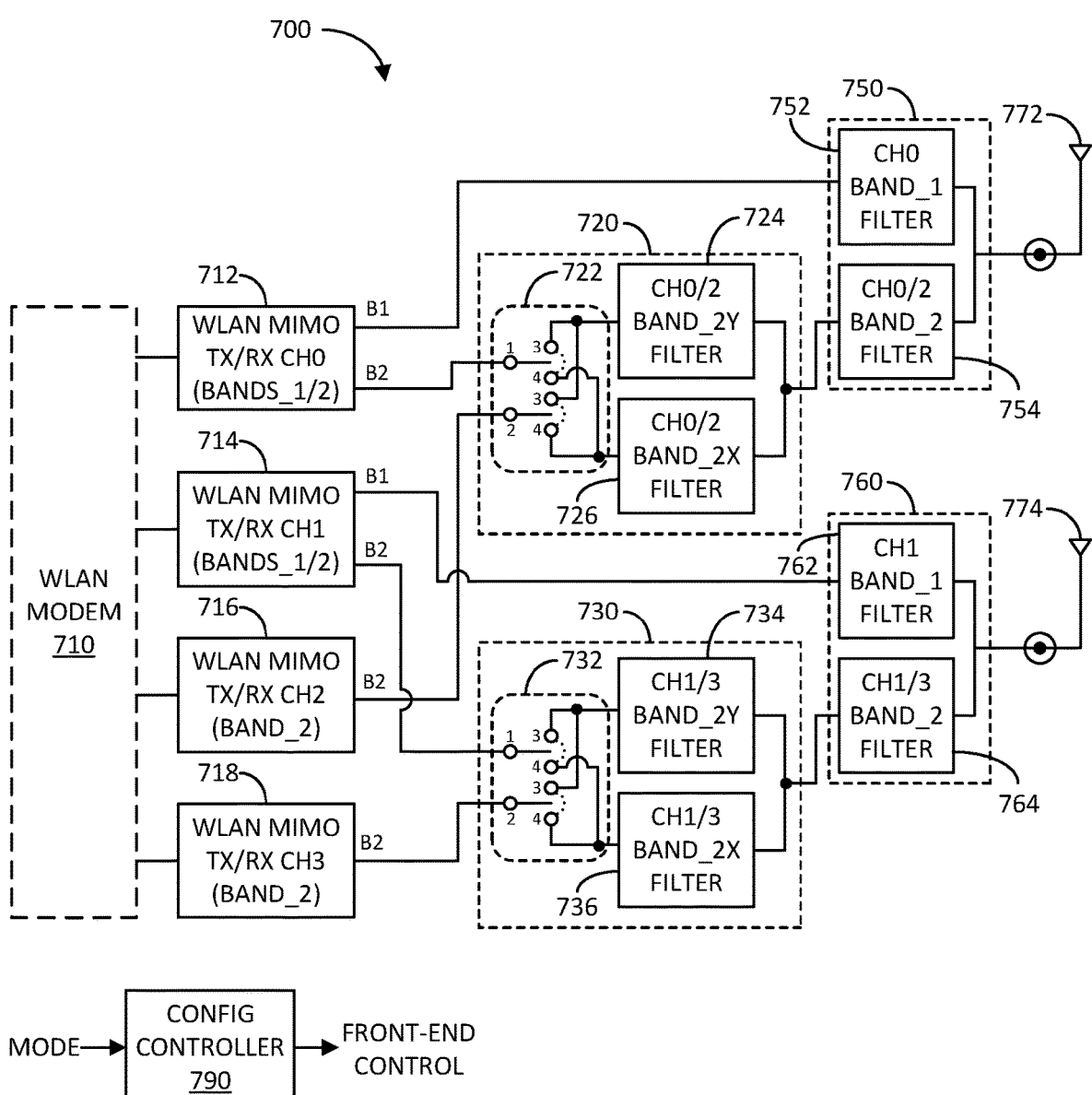
FIG. 7 illustrates a block diagram of another example radio frequency (RF) front end in accordance with another aspect of the disclosure.

FIG. 7 illustrates a block diagram of another example radio frequency (RF) front end 700 in accordance with another aspect of the disclosure. Similar to front end 600, the front end 700 includes switched diplexers 720 and 730 (or more generally, switched xPlexers) allowing various modes of operation (e.g., DBS, SBS, synchronous MLO, and asynchronous MLO) to be implemented using two antennas instead of four. In contrast to front end 600, the switched diplexers 720 and 730 of front end 700 uses full DPDT switches instead of ½ DPDT switches. This allows the front end 700 to receive other signals, such as Licensed-Assisted Access (LAA) signals from a base station while being in WiFi standby mode or receiving on the 5/6 GHz chains.

In particular, the front end 700 includes chains 0/1 WLAN (or other wireless communication protocol) MIMO transceivers 712 and 714, chains 2/3 WLAN (or other wireless communication protocol) MIMO transceivers 716 and 718, diplexers 750 and 760 including chains 0/1 band_1/2 filters 752 and 754 and chains 0/2 and 1/3 band_1/2 filters 762 and 764, and a configuration controller 790. These elements of front end 700 are similar to the corresponding ones of front ends 500 and 600 previously discussed. Accordingly, the WLAN MIMO transceivers 712, 714, 716, and 718 are coupled to a WLAN (or other wireless communication protocol) modem 710, and the diplexers 750 and 760 are coupled to antennas 772 and 774, respectively. It shall be understood that diplexers 750 and 760 may be optional, and the outputs of the switched diplexers 720 and 730 may be coupled to the antennas 772 and 774, respectively. It shall be understood that additional switched diplexers may be added or the switched diplexers 720 and 730 may be configured to allow other signals to use the same antennas 772 and 774, such as UWB signals.

The switched diplexer 720 includes a full double pole double throw (DPDT) switch 722, chains 0/2 sub-band_2Y filter 724, and chains 0/2 sub-band 2X filter 726. The DPDT switch 722 includes a first pole (labeled as "1") coupled to the B2 port of the chain 0 WLAN MIMO transceiver 712, a second pole (labeled as "2") coupled to the B2 port of chain 2 WLAN MIMO transceiver 716, a first throw (labeled as "3") coupled to the chains 0/2 sub-band_2Y filter 724, and a second throw (labeled as "4") coupled to the chains 0/2 sub-band 2X filter 726. The filters 724 and 726 are coupled to the chain 0/2 band_2 filter 754 of diplexer 750. Similar to switched filter bank 520 and xPlexer 620, the diplexer 720 may be implemented with relatively high-Q technology, such as BAW.

The switched diplexer 730 includes a full DPDT switch 732, chains 1/3 sub-band_2Y filter 734, and chains 1/3 sub-band 2X filter 736. The DPDT switch 732 includes a first pole (labeled as "1") coupled to the B2 port of the chain 1 WLAN MIMO transceiver 714, a second pole (labeled as "2") coupled to the B2 port of chain 3 WLAN MIMO transceiver 718, a first throw (labeled as "3") coupled to the chains 1/3 sub-band_2Y filter 734, and a second throw (labeled as "4") coupled to the chains 1/3 sub-band 2X filter 736. The filters 734 and 736 are coupled to the chain 1/3 band_2 filter 764 of diplexer 760. Similar to switched filter bank 530 and switched diplexer 630, the switched diplexer 730 may be implemented with relatively high-Q technology, such as BAW.

In accordance with a DBS mode of operation as discussed with reference to wireless communication system 100, the configuration controller 790 configures the chains 0/1 WLAN MIMO transceivers 712 and 714 to generate band1 RF Tx MIMO signals (e.g., 2.4 GHz band) for effectuating the spatial streams 112 and 114 for data transmissions to wireless devices 120 and 130, respectively. Simultaneously, the configuration controller 790 configures the chains 2/3 WLAN MIMO transceivers 716 and 718 to generate band_2 RF Tx MIMO signals (e.g., 5 and/or 6 GHz band) for effectuating the spatial streams 116 and 118 for data transmission to wireless device 140.

If the RF Tx MIMO signals generated by the WLAN MIMO transceivers 716 and 718 are in sub-band 2X (e.g., UNII-1 or -2A), the configuration controller 790 configures the DPDT switches 722 and 732 of the switched diplexers 720 and 730 to couple the poles "2" to the throws "4", respectively. In this configuration, the chains 0/1 band1 RF Tx MIMO signals are sent to the antennas 772 and 774 through chains 0/1 band1 filters 752 and 762 of diplexers 750 and 760, respectively; and the chains 2/3 band_2 RF Tx MIMO signals are sent to the antennas 772 and 774 through chains 2/3 band_2X filters 726 and 736 of switched diplexers 720 and 730 and chains 0/2 and 1/3 band_2 filters 754 and 764 of diplexers 750 and 760, respectively. When the WiFi communications are on standby, the configuration controller 790 may configure the DPDT switches 722 and 734 to couple the poles "1" to the throws "3" to communicate with other devices via the CH0/2 and CH1/3 band_2Y filters 724 and 734.

If the RF Tx MIMO signals generated by the WLAN MIMO transceivers 716 and 718 are in sub-band 2Y (e.g., UNII-2C to -8), the configuration controller 790 configures the DPDT switches 722 and 732 of the switched diplexers 720 and 730 to couple the poles "2" to the throws "3", respectively. In this configuration, the chains 0/1 band1 RF Tx MIMO signals are sent to the antennas 772 and 774 through chains 0/1 band1 filters 752 and 762 of diplexers 750 and 760, respectively; and the chains 2/3 band_2 RF Tx MIMO signals are sent to the antennas 772 and 774 through chains 0/2 and 1/3 band_2Y filters 724 and 734 of switched diplexers 720 and 730 and chains 0/2 and 1/3 band_2 filters 754 and 764 of diplexers 750 and 760, respectively. When the WiFi communications are on standby, the configuration controller 790 may configure the DPDT switches 722 and 732 to couple the poles "1" to the throws "4" to communicate with other devices via the CH0/2 and CH1/3 band_2X filters 726 and 736, such as receive LAA signals from a base station.

In accordance with an SBS mode of operation as discussed with reference to wireless communication system 200, the configuration controller 790 configures the chains 0/1 WLAN MIMO transceivers 712 and 714 to generate sub-band_2Y RF Tx MIMO signals (e.g., one of sub-band UNII-2C to -8 of the 5 and/or 6 GHz band) for effectuating the spatial streams 216 and 218 for data transmissions to wireless device 240.

Simultaneously, the configuration controller 790 configures the chains 2/3 WLAN MIMO transceivers 716 and 718 to generate sub-band_2X RF Tx MIMO signals (e.g., one of sub-band UNII-1 or -2A of the 5 and/or 6 GHz band) for effectuating the spatial streams 212 and 214 for data transmission to wireless devices 220 and 230, respectively.

Additionally, the configuration controller 790 configures the DPDT switches 722 and 732 of the switched diplexers 720 and 730 to couple the poles "1" and "2" to the throws "3" and "4", respectively. In this configuration, the chains 0/1 band_2 RF Tx MIMO signals are sent to the antennas 772 and 774 through chains 0/2 and 1/3 band_2Y filters 724 and 734 of switched diplexers 720 and 730, and chains 0/2 and 1/3 band_2 filters 754 and 764 of diplexers 750 and 760, respectively; and the chains 2/3 band_2 RF Tx MIMO signals are sent to the antennas 772 and 774 through chains 0/2 and 1/3 band_2X filters 726 and 736 of switched diplexers 720 and 730 and chains 0/2 and 1/3 band_2 filters 754 and 764 of diplexers 750 and 760, respectively.

In accordance with synchronous MLO mode of operation as discussed with reference to wireless communication system 300, the configuration controller 790 configures the front end similar to that of SBS mode to generate the spatial streams 314 and 316 for data transmission to the wireless device 330. In accordance with asynchronous MLO operation as discussed with reference to wireless communication system 400, the configuration controller 790 configures the front end similar to that of SBS mode to generate the spatial streams 414 for data transmission to the wireless device 430, with the exception that chains 0/1 WLAN MIMO transceivers 712 and 714 may optionally be configured to receive RF signals 416. Optionally, in asynchronous MLO operation, the configuration controller 790 may configure the chains 0/1 WLAN MIMO transceivers 712 and 714 for transmission, and the chains 2/3 WLAN MIMO transceivers 716 and 718 for reception.

Figure 8A:
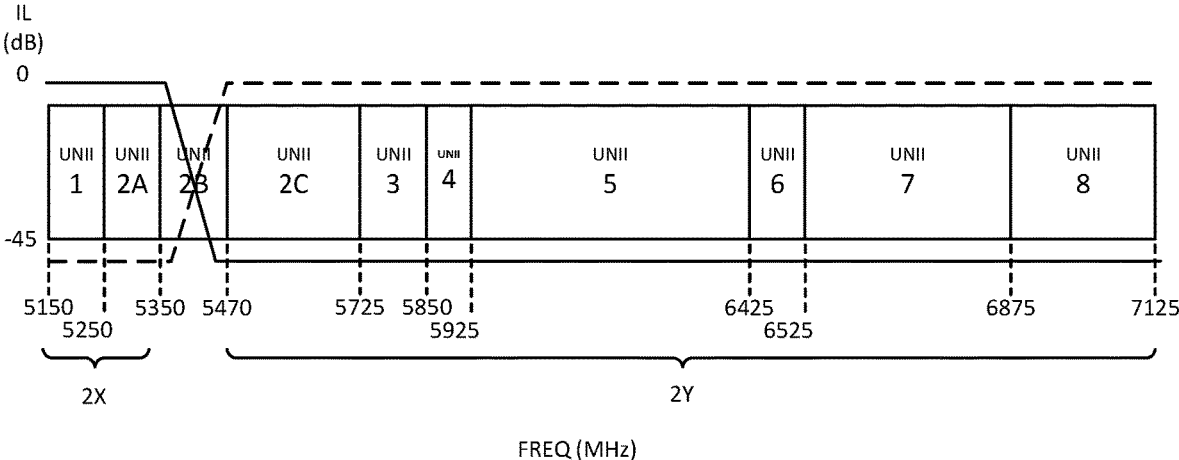
FIG. 8A illustrates a graph of an insertion loss versus frequency specification for an example diplexer in accordance with another aspect of the disclosure.

FIG. 8A illustrates a graph of an insertion loss versus frequency specification for an example diplexer in accordance with another aspect of the disclosure. The horizontal axis of the graph represents frequency extending from 5150 to 7125 MHz (the 5-6 GHz frequency band). The vertical axis represents insertion loss (IL) in decibels (dB) extending from 0 dB at the top to −45 dB at the bottom. The graph also identifies the sub-bands within the 5-6 GHz band including UNII-1 (5150-5250 MHz), UNII-2A (5250-5350 MHz), UNII-2B (5350-5470 MHz), UNII-2C (5470-5725 MHz), UNII-3 (5725-5850 MHz), UNII-4 (5850-5925 MHz), UNII-5 (5925-6425 MHz), UNII-6 (6425-6525 MHz), UNII-7 (6525-6875 MHz), and UNII-8 (6875-7125 MHz).

The graph further shows example filter response specifications for the filters 624-626/634-636, and 724-726/734-736 of the diplexers 620/630, and 720/730, respectively. The filter response specification for filters 624-634/724-734 is indicated as a dashed line, and the filter response specification for filters 626-636/726-736 is indicated as a solid line. As the graph shows, the filter response specification for filters 624-634/724-734 may have at least −45 dB rejection within sub-bands UNII-1 and -2A (e.g., sub-band_2X), minimal insertion loss (e.g., ≤1-2 dB) within sub-bands UNII-2C to -8 (e.g., sub-band_2Y), and a transition within the UNII-2B sub-band (as this sub-band may be restricted in some jurisdictions). As the graph further shows, the filter response specification for filters 626-636/726-736 may have minimal insertion loss (e.g., ≤1-2 dB) within sub-bands UNII-1 and -2A, at least −45 dB rejection within sub-bands UNII-2C to -8, and a transition within the UNII-2B sub-band. The isolation values and frequency response specifications are provided as examples. However other isolation/filter characteristics may be possible depending on different front end implementations, specifications, applications, channel conditions, and/or other factors.

Figure 8B:
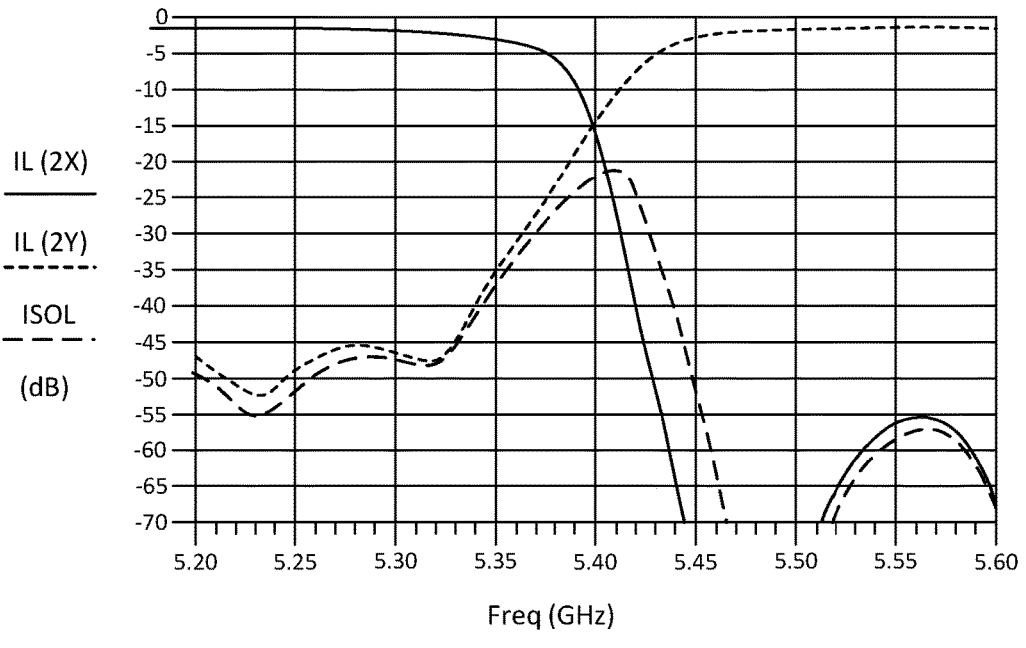
FIG. 8B illustrates a graph of a measured insertion loss versus frequency for an example bulk acoustic wave (BAW) diplexer in accordance with another aspect of the disclosure.

FIG. 8B illustrates a graph of a measured insertion loss versus frequency for an example BAW diplexer in accordance with another aspect of the disclosure. Similarly, the horizontal axis of the graph represents frequency extending from 5.2 to 5.6 GHz (within the 5-6 GHz frequency band). The vertical axis represents insertion loss (IL) in decibels (dB) extending from 0 dB at the top to −70 dB at the bottom. The filter response for filter 626-636/726-736 is indicated as a solid line, and the filter response for filter 624-634/724-734 is indicated as a short-dash line. The long-dash line represents the isolation between the filters.

As the graph further shows, the filter response specification for filter 626-636/726-736 may have an insertion loss of about −1 dB for frequencies below the upper end of sub-band UNII-2A (5350 MHz), and at least −55 dB rejection for frequencies above the lower end of sub-band UNII-2C (5470 MHz). Thus, the transition of the filter 626-636/726-736 is within sub-band UNII-2B. The filter response specification for filter 624-634/724-734 may have an insertion loss of about −2 dB or less for frequencies above the lower end of sub-band UNII-2C (5470 MHz), and at least −45 dB rejection for frequencies below the upper end of sub-band UNII-2A (5350 MHz). Similarly, the transition of the filter 624-534/724-734 is within sub-band UNII-2B.

Figure 9A:
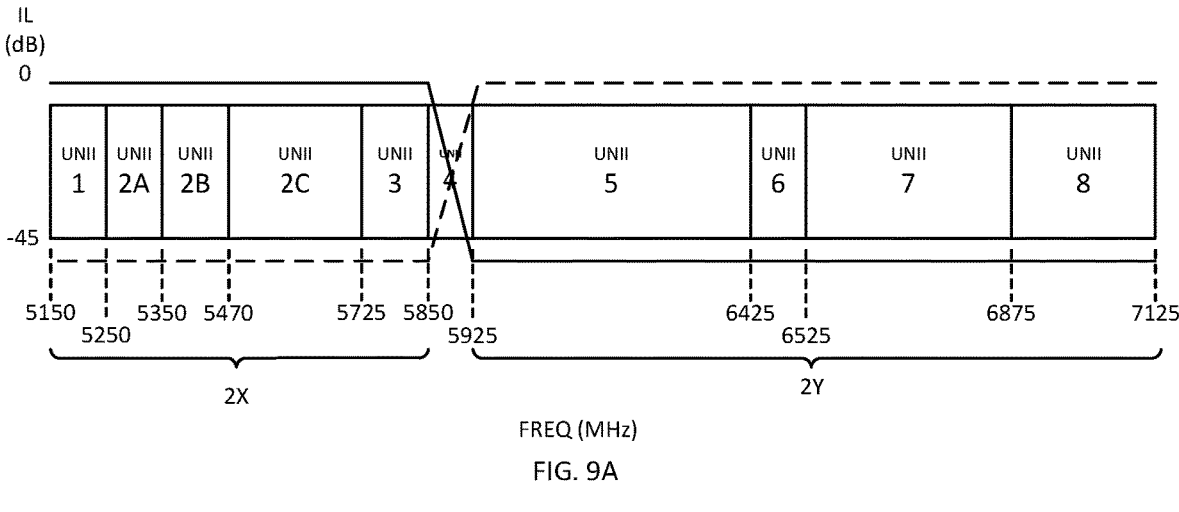
FIG. 9A illustrates a graph of an insertion loss versus frequency specification for another example diplexer in accordance with another aspect of the disclosure.

FIG. 9A illustrates a graph of an insertion loss versus frequency specification for another example diplexer in accordance with another aspect of the disclosure. Similarly, the horizontal axis of the graph represents frequency extending from 5150 to 7125 MHz (the 5-6 GHz frequency band). The vertical axis represents insertion loss (IL) in decibels (dB) extending from 0 dB at the top to −45 dB at the bottom. The graph also identifies the sub-bands within the 5-6 GHz band.

The graph further shows another example filter response specifications for the filters 624-626/634-636, and 724-726/734-736 of the diplexers 620/630, and 720/730, respectively. The filter response specification for filters 624-634/724-734 is indicated as a dashed line, and the filter response specification for filters 626-636/726-736 is indicated as a solid line. As the graph shows, the filter response specification for filters 624-634/724-734 may have at least −45 dB rejection within sub-bands UNII-1 to -3 (e.g., sub-band_2X), minimal insertion loss (e.g., ≤1-2 dB) within sub-bands UNII-5 to -8 (e.g., sub-band_2Y), and a transition within the UNII-4 sub-band (as this may be more suitable in certain jurisdictions). As the graph further shows, the filter response specification for filters 626-636/726-736 may have minimal insertion (e.g., ≤1-2 dB) within sub-bands UNII-1 to -3, at least −45 dB rejection within sub-bands UNII-5 to -8, and a transition within the UNII-4 sub-band.

Figure 9B:
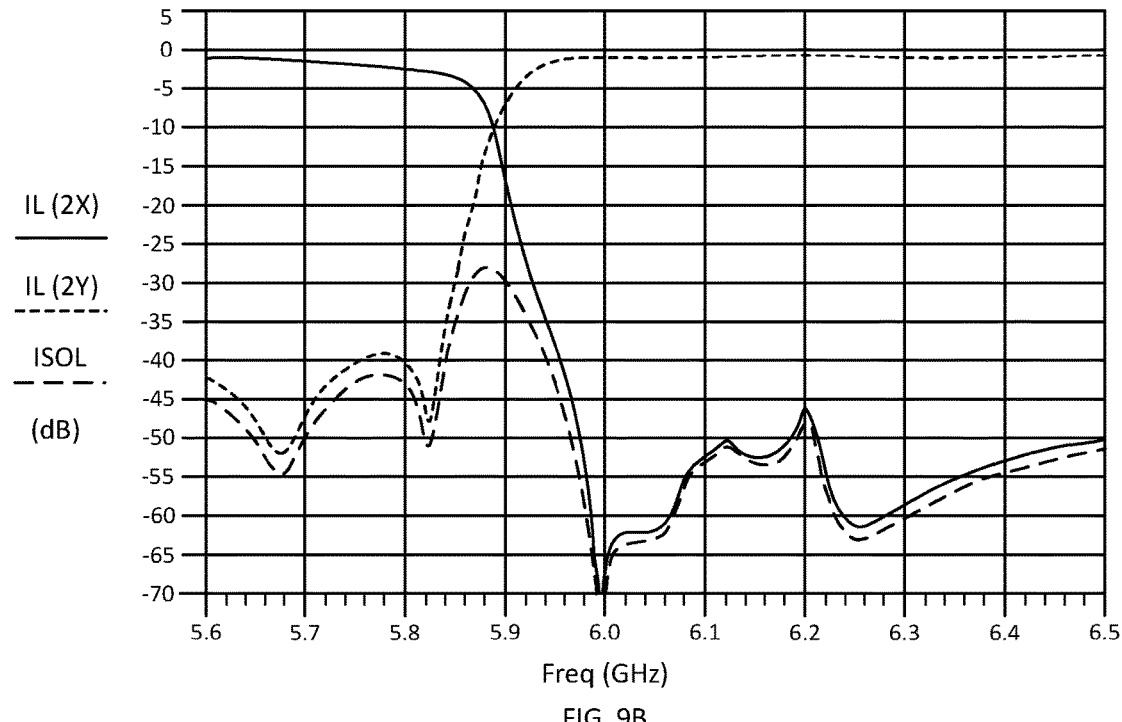
FIG. 9B illustrates a graph of a measured insertion loss versus frequency for another example bulk acoustic wave (BAW) diplexer in accordance with another aspect of the disclosure.

FIG. 9B illustrates a graph of a measured insertion loss versus frequency for an example BAW diplexer in accordance with another aspect of the disclosure. Similarly, the horizontal axis of the graph represents frequency extending from 5.6 to 6.5 GHz (within the 5-6 GHz frequency band). The vertical axis represents insertion loss (IL) in decibels (dB) extending from 0 dB at the top to −70 dB at the bottom. The filter response for filter 626-636/726-736 is indicated as a solid line, and the filter response for filter 624-634/724-734 is indicated as a short-dash line. The long-dash line represents the isolation between the filters.

As the graph further shows, the filter response specification for filter 626-636/726-736 may have an insertion loss of about −2 dB for frequencies below the upper end of sub-band UNII-3 (5850 MHz), and at least −45 dB rejection for frequencies above the lower end of sub-band UNII-5 (5925 MHz). Thus, the transition region of the filter 626-636/726-736 is within sub-band UNII-4. The filter response specification for filter 624-634/724-734 may have an insertion loss of about −2 dB or less for frequencies above the lower end of sub-band UNII-5 (5925 MHz), and at least −45 dB rejection for frequencies below the upper end of sub-band UNII-3 (5850 MHz). Similarly, the transition of the filter 624-634/724-734 is within sub-band UNII-4.

Figure 10:
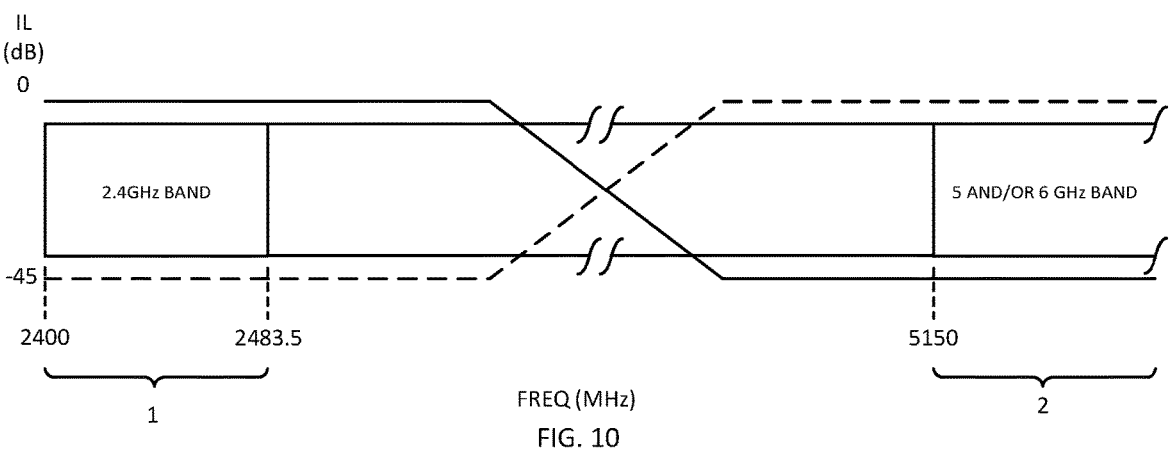
FIG. 10 a graph of an insertion loss versus frequency specification for yet another example diplexer in accordance with another aspect of the disclosure.

FIG. 10 illustrates a graph of an insertion loss versus frequency specification for yet another example diplexer in accordance with another aspect of the disclosure. The horizontal axis of the graph represents frequency extending from 2400 MHz (e.g., the lower end of the 2.4 GHz band) to above 5150 MHz (above the lower end of the 5 and/or 6 GHz frequency band). The vertical axis represents insertion loss (IL) in decibels (dB) extending from 0 dB at the top to −45 dB at the bottom.

The graph further shows an example filter response specification for the filters 652-654/662-664, and 752-754/762-764 of the diplexers 650/660, and 750/760, respectively. The filter response specification for filters 652-662/752-762 is indicated as a solid line, and the filter response specification for filters 654-664/754-764 is indicated as a dashed line. As the graph shows, the filter response specification for filters 652-662/752-762 may have minimal insertion loss (e.g., ≤1-2 dB) within the 2.4 GHz band, at least −45 dB rejection within the 5/6 GHz band, and a transition between the 2.4 and 5/6 GHz bands. As the graph further shows, the filter response specification for filters 654-664/754-764 may have at least −45 dB rejection within the 2.4 GHz band, minimal insertion loss (e.g., ≤1-2 dB) within the 5/6 GHz band, and a transition between the 2.4 and 5/6 GHz bands. As the frequency space between the bands is relatively large (e.g., greater than 2500 MHz), the diplexers 650/660, and 750/760 may be implemented using filter technologies which provide lower Quality factors, such as LTCC, POG, SAW, or other technology.

Figure 11:
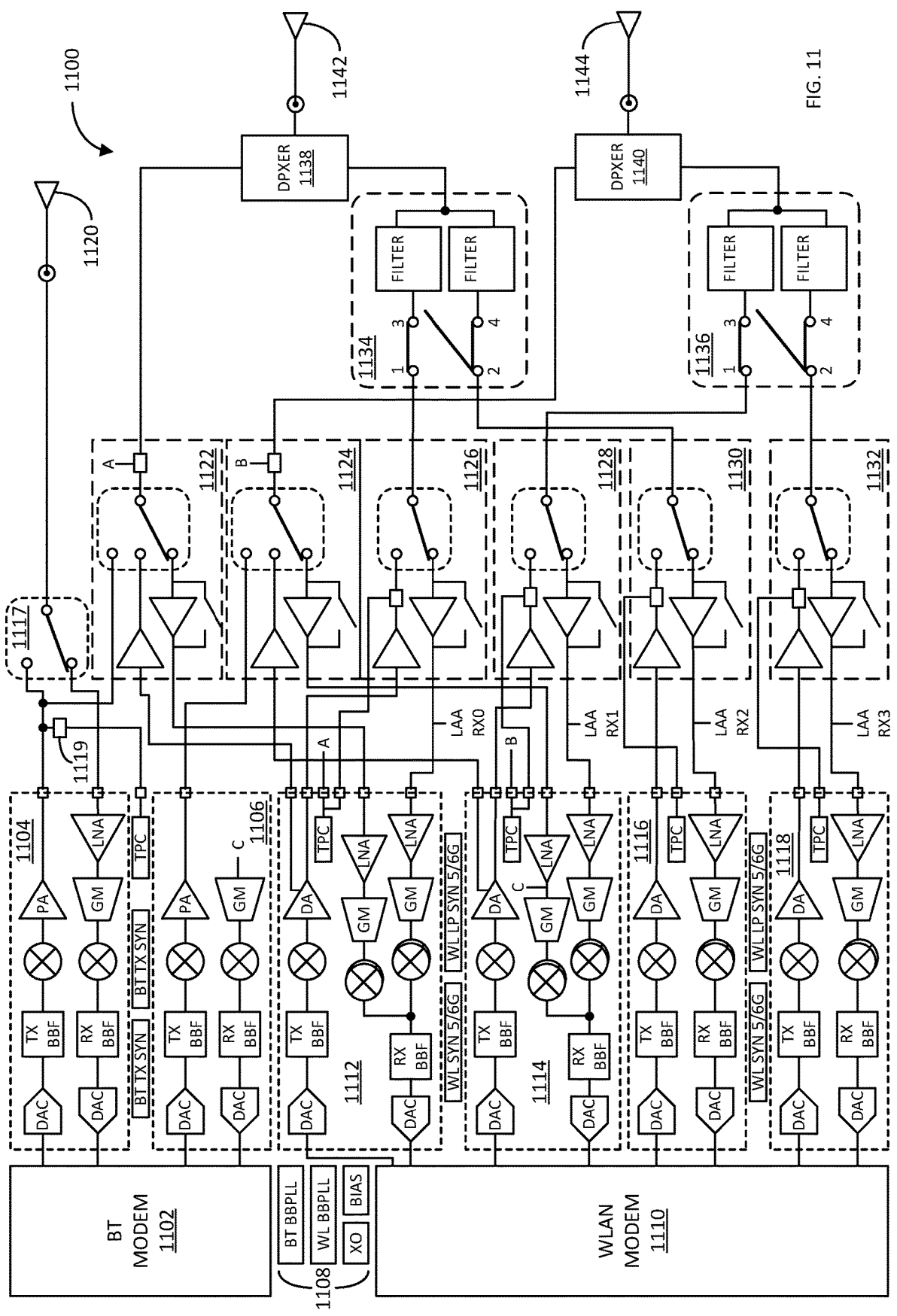
FIG. 11 illustrates a block diagram of another example radio frequency (RF) front end in accordance with another aspect of the disclosure.

FIG. 11 illustrates a block diagram of another example radio frequency (RF) front end 1100 in accordance with another aspect of the disclosure. The RF front end 1100 is an example more detailed implementation of the RF front end 600 previously discussed. One difference between the RF front end 1100 and RF front end 600 is that RF front end 1100 includes circuitry associated with Bluetooth (BT) (or other wireless communication protocol) wireless communications, which share the 2.4 GHz band with the WLAN (or other wireless communication protocol) wireless communications. Other differences relate to more detail circuitry as discussed further herein.

The RF front end 1100 includes a chain 0 Bluetooth (BT) transceiver 1104, a chain 1 BT transceiver 1106, a chain 0 WLAN transceiver 1112, a chain 1 WLAN transceiver 1114, a chain 2 WLAN transceiver 1116, and a chain 3 WLAN transceiver 1118. The chains 0/1 BT transceivers 1104 and 1106 are coupled to a BT modem 1102 to receive therefrom baseband (BB) transmit (Tx) signals, and provide thereto BB received (Rx) signals. Similarly, the chains 0-3 WLAN transceivers 1112, 1114, 1116, and 1118 are coupled to a WLAN modem 1110 to receive therefrom baseband (BB) transmit (Tx) signals, and provide thereto BB received (Rx) signals. On the modem side, additional circuitry 1108, such as a BT BB phase locked loop (PLL), a WLAN (or WL) BBPLL, a crystal oscillator (XO) and bias circuitry, are coupled to the BT modem 1102 and WLAN modem 1110 to drive the baseband processing operations therein.

On the transmitter-side, each of the chains 0/1 BT transceivers 1104 and 1106 includes a digital-to-analog converter (DAC) including an input coupled to the BT modem 1102 to receive a BB Tx signal therefrom, a Tx baseband filter (BBF) including an input coupled to an output of the DAC, a frequency-upconverting mixer including a first input coupled to an output of the TxBBF and a second input coupled to a local oscillator (LO) (not shown), and a BT power amplifier (PA) including an input coupled to an output of the mixer. On the receiver-side, each of the chains 0/1 BT transceivers 1104 and 1106 includes a transconductance (GM) amplifier, a frequency-downconverting mixer including a first input coupled to an output of the GM amplifier and a second input coupled to an LO (not shown), an RxBBF including an input coupled to an output of the mixer, and an analog-to-digital converter (ADC) including an input coupled to an output of the RxBBF, and an output coupled to the BT modem 1102 to provide an Rx BB signal thereto. The chain 0 BT wireless transceiver 1104 may further include a low noise amplifier (LNA) including an output coupled to an input of the GM amplifier. Further, associated with the chains 0/1 BT transceivers 1104 and 1106, the RF front end 1100 includes BT transmitter synchronization (SYN) circuitry, BT receiver synchronization (SYN) circuitry, and a transmit power control (TPC) circuit.

On the transmitter-side, each of the chains 0/1 WLAN transceivers 1112 and 1114 includes a DAC including an input coupled to the WLAN modem 1110 to receive a BB Tx signal therefrom, a TxBBF including an input coupled to an output of the DAC, a frequency-upconverting mixer including a first input coupled to an output of the TxBBF and a second input coupled to a local oscillator (LO) (not shown), and a driver amplifier (DA) including an input coupled to an output of the mixer. On the receiver-side, each of the chains 0/1 WLAN transceivers 1114 and 1116 includes a pair of LNAs (e.g., tuned to different bands 2.4 and 5/6 GHz), a pair of GM amplifiers including inputs coupled to respective outputs of the pair of LNAs, a pair of frequency-downconverting mixers including respective first inputs coupled to respective outputs of the pair of GM amplifiers, and respective second inputs coupled to a pair of LOs (not shown), a RxBBF including an input coupled to outputs of the pair of mixers, and an ADC including an input coupled to an output of the RxBBF, and an output coupled to the WLAN modem 1110 to provide an Rx BB signal thereto. Both chains 0/1 WLAN transceivers 1112 and 1114 may each include a transmit power control (TPC) circuit. Further, associated with the chains 0/1 WLAN transceivers 1112 and 1114, the RF front end 1100 includes WLAN synchronization (SYN) circuitry (2/5/6 GHz bands) and WL low power (LP) synchronization (SYN) circuitry (2.4 GHz band).

The chains 0/1 WLANs transceivers 1112 and 1114 may share some circuitry with the chains 0/1 BT transceivers 1104 and 1106, respectively. For example, WLANs transceivers 1112 and 1114 may share their DAs with the BT transceivers 1104 and 1106, respectively. In this regard, the DAs of the WLAN transceivers 1112 and 1114 includes inputs coupled to outputs of the frequency-upconverting mixers of the BT transceivers 1104 and 1106, respectively. Additionally, the WLANs transceivers 1112 and 1114 may share their 2.4 GHz LNAs with the BT transceivers 1104 and 1106, respectively. In this regard, the 2.4 GHz of the WLAN transceivers 1112 and 1114 includes outputs coupled to inputs of the GM amplifiers of the BT transceivers 1104 and 1106, respectively.

On the transmitter-side, each of the chains 2/3 WLAN transceivers 1116 and 1118 includes a DAC including an input coupled to the WLAN modem 1110 to receive a BB Tx signal therefrom, a TxBBF including an input coupled to an output of the DAC, a frequency-upconverting mixer including a first input coupled to an output of the TxBBF and a second input coupled to a local oscillator (LO) (not shown), and a driver amplifier (DA) including an input coupled to an output of the mixer. On the receiver-side, each of the chains 2/3 WLAN transceivers 1116 and 1118 includes an LNA, a GM amplifier including an input coupled to an output of the LNA, a frequency-downconverting mixer including a first input coupled to an output of the GM amplifier, and a second input coupled to an LO (not shown), a RxBBF including an input coupled to an output of the mixer, and an ADC including an input coupled to an output of the RxBBF, and an output coupled to the WLAN modem 1110 to provide an Rx BB signal thereto. Both chains 2/3 WLAN transceivers 1116 and 1118 may each include a transmit power control (TPC) circuit. Further, associated with the chains 2/3 WLAN transceivers 1116 and 1118, the RF front end 1100 includes WLAN synchronization (SYN) circuitry (5/6 GHz band) and WL low power (LP) synchronization (SYN) circuitry (5/6 GHz band).

The RF front end 1100 includes circuitry configured to perform BT communications independent of the WLAN circuitry. Such circuitry includes a single pole double throw (SPDT) switch 1117, a power detector 1119, and an antenna 1120. The SPDT switch 1117 includes throws coupled to output and input of the BT PA and LNA of chain 0 BT transceiver 1104, respectively. The power detector 1119 includes an input coupled to the output of the BT PA, and an output coupled to the TPC circuit of the chain 0 BT transceiver 1104. The SPDT switch 1117 includes a pole coupled to the antenna 1120 via, for example, a coaxial transmission line.

The RF front end 1100 further includes a set of PA-LNA signal routing circuits 1122, 1124, 1126, 1128, 1130, and 1132. Each of the set of PA-LNA signal routing circuits 1122, 1124, 1126, 1128, 1130, and 1132 includes a power amplifier (PA), a by-passable LNA, a triple throw single pole (TTSP) switch, and a power detector.

With regard to PA-LNA signal routing circuit 1122, the PA includes an input coupled to an output of the DA of chain 0 WLAN transceiver 1112, and an output coupled to a middle throw of the TTSP switch. The by-passable LNA includes an input coupled to the lower throw of the TTSP switch, and an output coupled to an input of the 2.4 GHz LNA of the chain 0 WLAN transceiver 1112. The upper throw of the TTSP switch is coupled to the output of the BT PA of the chain 0 BT transceiver 1104. The pole of the TTSP switch is coupled to a diplexer 1138, which corresponds to the diplexer 650 of RF front end 600 previously discussed. The power detector includes an input coupled to the pole of the TTSP switch and an output coupled to the TPC circuit of chain 0 WLAN transceiver 1112.

With regard to PA-LNA signal routing circuit 1124, the PA includes an input coupled to an output of the DA of chain 1 WLAN transceiver 1114, and an output coupled to a middle throw of the TTSP switch. The by-passable LNA includes an input coupled to the lower throw of the TTSP switch, and an output coupled to an input of the 2.4 GHz LNA of the chain 1 WLAN transceiver 1114. The upper throw of the TTSP switch is coupled to the output of the BT PA of the chain 1 BT transceiver 1106. The pole of the TTSP switch is coupled to a diplexer 1140, which corresponds to the diplexer 660 of RF front end 600 previously discussed. The power detector includes an input coupled to the pole of the TTSP switch and an output coupled to the TPC circuit of chain 1 WLAN transceiver 1114.

With regard to PA-LNA signal routing circuit 1126, the PA includes an input coupled to the output of the DA of chain 0 WLAN transceiver 1112, and an output coupled to a middle throw of the TTSP switch. The by-passable LNA includes an input coupled to the lower throw of the TTSP switch, and an output coupled to an input of the 5/6 GHz LNA of the chain 0 WLAN transceiver 1112 via one branch of a power splitter; the other branch of the power splitter is coupled to a cellular transceiver (not shown) for LAA signal processing. The upper throw of the TTSP switch is floating. The pole of the TTSP switch is coupled to a first pole "1" of a ½ DPDT switch of a switched diplexer 1134, which corresponds to the ½ DPDT switch 622 of switched diplexer 620 of RF front end 600 previously discussed. The power detector includes an input coupled to the output of the PA and an output coupled to the TPC circuit of chain 0 WLAN transceiver 1112.

With regard to PA-LNA signal routing circuit 1128, the PA includes an input coupled to the output of the DA of chain 1 WLAN transceiver 1114, and an output coupled to a middle throw of the TTSP switch. The by-passable LNA includes an input coupled to the lower throw of the TTSP switch, and an output coupled to an input of the 5/6 GHz LNA of the chain 1 WLAN transceiver 1114 via one branch of a power splitter; the other branch of the power splitter is coupled to another cellular transceiver (not shown) for LAA signal processing. The upper throw of the TTSP switch is floating. The pole of the TTSP switch is coupled to a first pole "1" of a ½ DPDT switch of a switched diplexer 1136, which corresponds to the ½ DPDT switch 632 of switched diplexer 630 of RF front end 600 previously discussed. The power detector includes an input coupled to the output of the PA and an output coupled to the TPC circuit of chain 1 WLAN transceiver 1114.

With regard to PA-LNA signal routing circuit 1130, the PA includes an input coupled to the output of the DA of chain 2 WLAN transceiver 1116, and an output coupled to a middle throw of the TTSP switch. The by-passable LNA includes an input coupled to the lower throw of the TTSP switch, and an output coupled to an input of the LNA of the chain 2 WLAN transceiver 1116 via one branch of a power splitter; the other branch of the power splitter is coupled to a cellular transceiver (not shown) for LAA signal processing. The upper throw of the TTSP switch is floating. The pole of the TTSP switch is coupled to a second pole "2" of the ½ DPDT switch of the switched diplexer 1134. The power detector includes an input coupled to the output of the PA and an output coupled to the TPC circuit of chain 2 WLAN transceiver 1116.

With regard to PA-LNA signal routing circuit 1132, the PA includes an input coupled to the output of the DA of chain 3 WLAN transceiver 1118, and an output coupled to a middle throw of the TTSP switch. The by-passable LNA includes an input coupled to the lower throw of the TTSP switch, and an output coupled to an input of the LNA of the chain 3 WLAN transceiver 1118 via one branch of a power splitter; the other branch of the power splitter is coupled to another cellular transceiver (not shown) for LAA signal processing. The upper throw of the TTSP switch is floating. The pole of the TTSP switch is coupled to a second pole "2" of the ½ DPDT switch of the switched diplexer 1136. The power detector includes an input coupled to the output of the PA and an output coupled to the TPC circuit of chain 3 WLAN transceiver 1118.

Similar to RF front end 600, the switched diplexer 1134 is coupled to diplexer 1138, and the switched diplexer 1136 is coupled to diplexer 1140. Also, similar to RF front end 600, the diplexer 1138 is coupled to an antenna 1142, which corresponds to antenna 672 associated with RF front end 600. Further, the diplexer 1140 is coupled to an antenna 1144, which corresponds to antenna 674 associated with RF front end 600. It shall be understood that diplexers 1138 and 1140 may be optional, and the outputs of the switched diplexers 1134 and 1136 may be coupled to the antennas

1142 and 1144, respectively. It shall be understood that additional switched diplexers may be added or the switched diplexers 1134 and 1136 may be configured to allow other signals to use the same antennas 1142 and 1144, such as UWB signals.

The operation of the RF front end 1100 to implement the various operation modes as discussed (e.g., DBS, SBS, synchronous MLO, and asynchronous MLO) is similar to that of RF front end 600 previously discussed in detail. Further, because the RF front end 1100 also includes the BT MIMO wireless transceivers 1104 and 1106, BT MIMO signals may be transmitted and/or received via the antennas 1142 and 1144.

Figure 12:
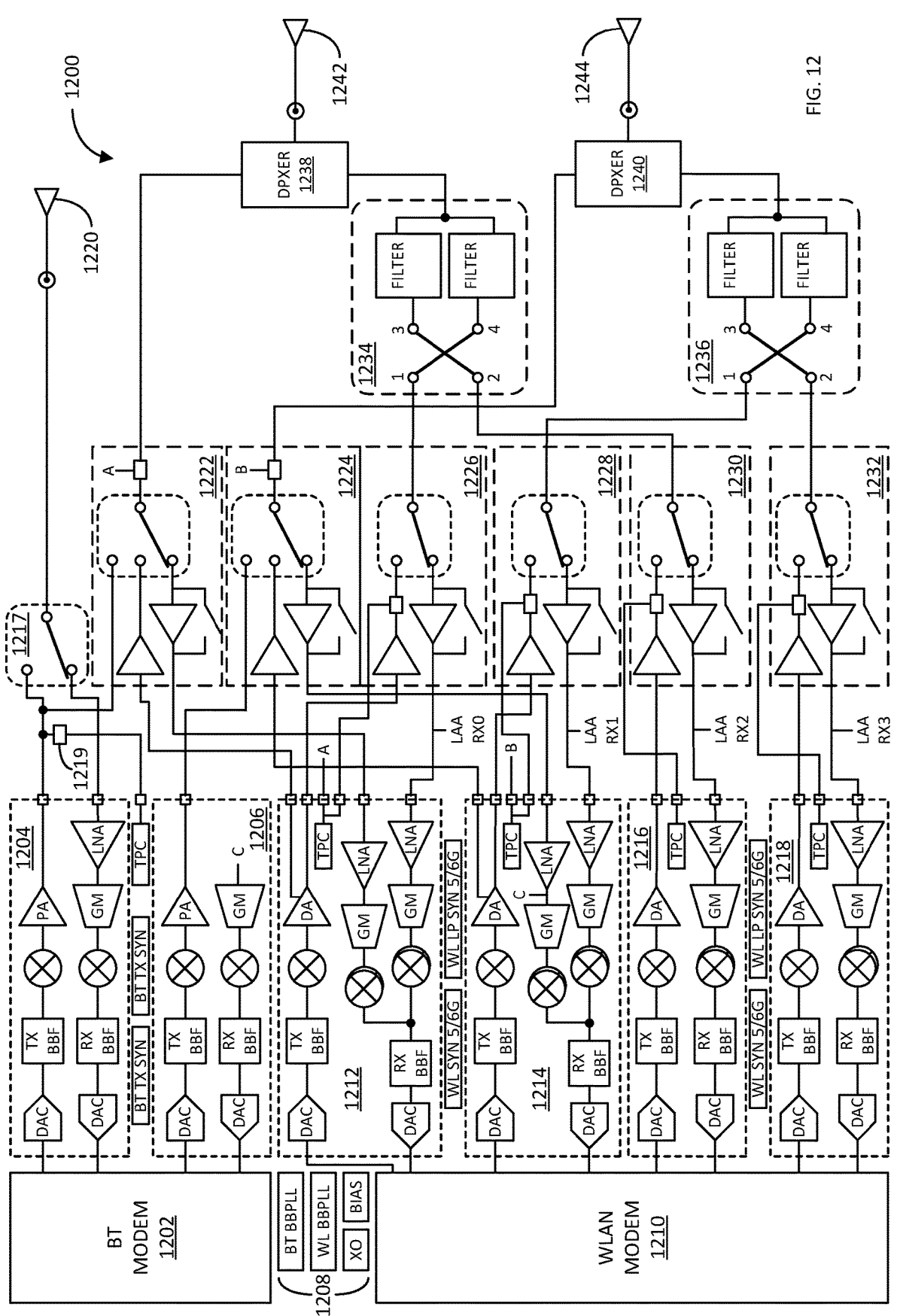
FIG. 12 illustrates a block diagram of another example radio frequency (RF) front end in accordance with another aspect of the disclosure.

FIG. 12 illustrates a block diagram of another example radio frequency (RF) front end 1200 in accordance with another aspect of the disclosure. The RF front end 1200 is similar to RF front end 1100, and includes many of the same elements as indicated by the same reference numbers but with a "12" being the most significant digits instead. The RF front end 1200 differs from RF front end 1100 in that the switched diplexers 1234 and 1236 include full DPDT switches instead of ½ DPDT switches; similar to how RF front end 700 differs from RF front end 600. It shall be understood that diplexers 1238 and 1240 may be optional, and the outputs of the switched diplexers 1234 and 1236 may be coupled to the antennas 1242 and 1244, respectively. It shall be understood that additional switched diplexers may be added or the switched diplexers 1234 and 1236 may be configured to allow other signals to use the same antennas 1242 and 1244, such as UWB signals.

The operation of the RF front end 1200 to implement the various operation modes as discussed (e.g., DBS, SBS, synchronous MLO, and asynchronous MLO) is similar to that of RF front end 700 previously discussed in detail. Further, because the RF front end 1200 also includes the BT MIMO wireless transceivers 1204 and 1206, BT MIMO signals may be transmitted and/or received via the antennas 1242 and 1244.

Figure 13:
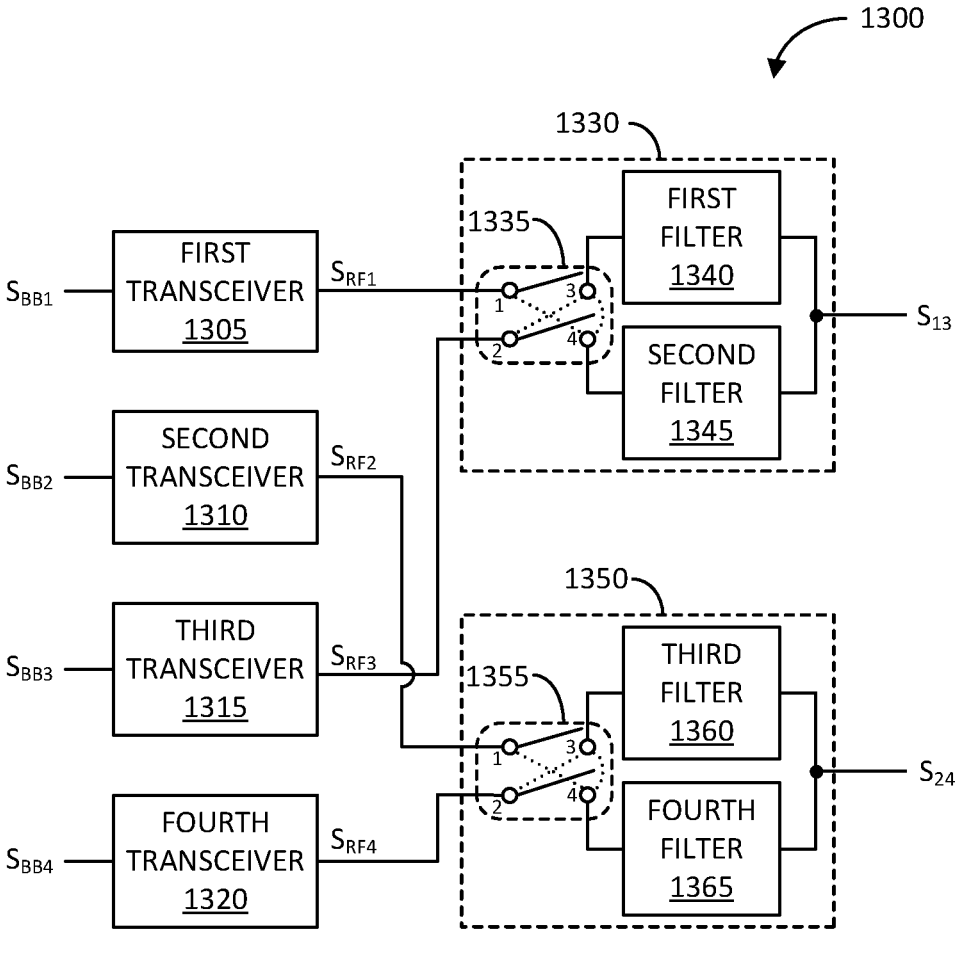
FIG. 13 illustrates a block diagram of another example radio frequency (RF) front end in accordance with another aspect of the disclosure.

FIG. 13 illustrates a block diagram of another example radio frequency (RF) front end 1300 in accordance with another aspect of the disclosure. The RF front end 1300 includes a first transceiver 1305, a second transceiver 1310, a third transceiver 1315, and a fourth transceiver 1320. The RF front end 1300 further includes a first switched diplexer 1330 (e.g., generally an xPlexer) and a second switched diplexer 1350 (e.g., generally an xPlexer).

The first switched diplexer 1330 includes a first switching device 1335, a first filter 1340, and a second filter 1345. The first switching device 1335 may be implemented as a first half or full double pole double throw (DPDT) switch including terminals "1", "2", "3", and "4". The terminal "1" is coupled to the first transceiver 1305, the terminal "2" is coupled to the third transceiver 1315, the terminal "3" is coupled to the first filter 1340, and the terminal "4" is coupled to the second filter 1345. The first and second filters 1340 and 1345 may include ports coupled together. In this configuration, the first transceiver 1305 may be selectively coupled to the first filter 1340 or second filter 1345, and the third transceiver 1315 may be selectively coupled to the second filter 1345 or first filter 1340 via the first DPDT switch 1335.

The second switched diplexer 1350 includes a second switching device 1355, a third filter 1360, and a fourth filter 1365. The second switching device 1355 may be implemented as a first half or full double pole double throw (DPDT) switch including terminals "1", "2", "3", and "4". The terminal "1" is coupled to the second transceiver 1310, the terminal "2" is coupled to the fourth transceiver 1320, the terminal "3" is coupled to the third filter 1360, and the terminal "4" is coupled to the fourth filter 1365. The third and fourth filters 1360 and 1365 may include ports coupled together. In this configuration, the second transceiver 1310 may be selectively coupled to the third filter 1360 or fourth filter 1365, and the fourth transceiver 1320 may be selectively coupled to the fourth filter 1365 or third filter 1360 via the second DPDT switch 1355.

The first transceiver 1305 includes circuitry configured to generate a first radio frequency (RF) signal $S_{RF1}$ based on a first baseband (BB) signal $S_{BB1}$. The second transceiver 1310 includes circuitry configured to generate a second RF signal $S_{RF2}$ based on a second BB signal $S_{BB2}$ The third transceiver 1315 includes circuitry configured to generate a third RF signal $S_{RF3}$ based on a third BB signal $S_{BB3}$ The fourth transceiver 1320 includes circuitry configured to generate a fourth RF signal $S_{RF4}$ based on a fourth BB signal $S_{BB4}$ Although these transceivers have been described with regard to transmission mode, it shall be understood that the transceivers may operate in reception mode.

The first transceiver 1305 may be configured to generate the first RF signal $S_{RF1}$ in a first band (e.g., 2.4 GHz) or a second band (e.g., 5 or 5/6 GHz). The second transceiver 1310 may be configured to generate the second RF signal $S_{RF2}$ in the first band or the second band. With regard to the second band, the first and second transceivers 1305 and 1310 may be configured to generate the first and second RF signals $S_{RF1}$ and $S_{RF2}$ in a particular sub-band (e.g., UNII-2C to -5 or -8, or UNII-5 to -8), respectively. The third and fourth transceivers 1315 and 1320 may be configured to generate the third and fourth RF signals $S_{RF3}$ and $S_{RF4}$ in the second band (e.g., 5 or 5/6 GHz or UNII-1 to -5 or -8).

The first and third filters 1340 and 1360 may have a passband (e.g., IL≤1 or 2 dB) in a first sub-band (e.g., UNII-2C to -5 or -8, or UNII-5 to -8) of the second band (e.g., 5 or 5/6 GHz), and a reject band (e.g., IL≥45 dB) in a second sub-band (e.g., UNII-1 to -2A or -2C) of the second band. The second and fourth filters 1345 and 1365 may have a passband (e.g., IL≤1 or 2 dB) in the second sub-band of the second band, and a reject band (e.g., IL≥45 dB) in the first sub-band of the second band.

The first and/or second filter 1340 and 1345 are configured to filter the first and/or third RF signals $S_{RF1}$ and/or $S_{RF3}$ to generate transmit signal $S_{13}$. Similarly, the third and/or fourth filter 1360 and 1365 are configured to filter the second and/or fourth RF signals $S_{RF2}$ and/or $S_{RF4}$ to generate transmit signal $S_{24}$. It shall be understood that these filters may also serve to filter received signals and provide them to the transceivers.

Figure 14:
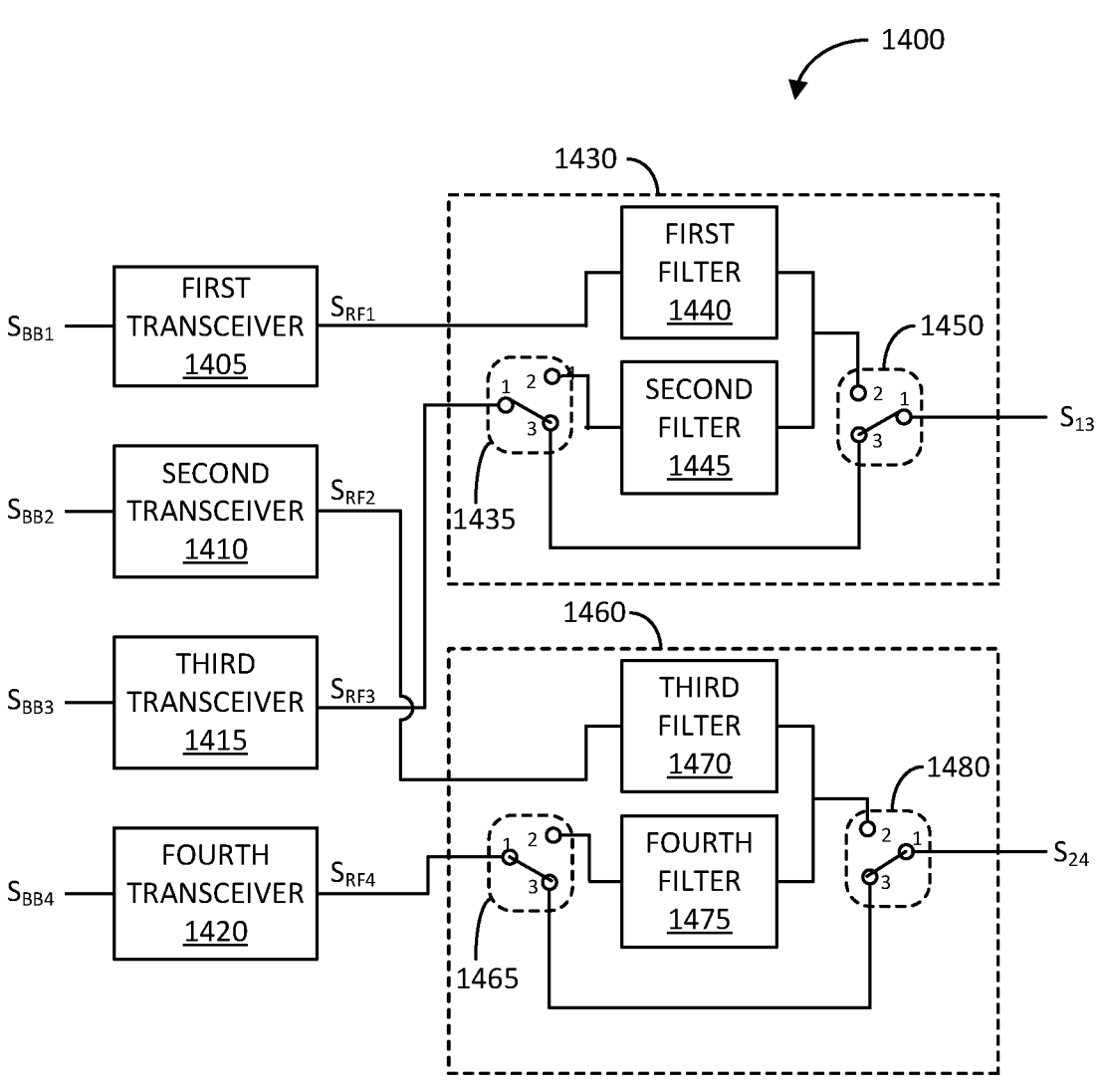
FIG. 14 illustrates a block diagram of another example radio frequency (RF) front end in accordance with another aspect of the disclosure.

FIG. 14 illustrates a block diagram of another example radio frequency (RF) front end 1400 in accordance with another aspect of the disclosure. The RF front end 1400 includes a first transceiver 1405, a second transceiver 1410, a third transceiver 1415, and a fourth transceiver 1420. The RF front end 1400 further includes a first switched diplexer 1430 (e.g., generally an xPlexer) and a second switched diplexer 1460 (e.g., generally an xPlexer).

The first switched diplexer 1430 includes a first switching device 1435, a first filter 1440, a second filter 1445, and a second switching device 1450. The first switching device 1435 may be implemented as a single pole double throw (SPDT) switch including terminals "1", "2", and "3". The second switching device 1450 may also be implemented as a SPDT switch including terminals "1", "2", and "3". The first filter 1440 includes a first port coupled to the first transceiver 1405.

With regard to the first switching device 1435, the terminal "1" is coupled to the third transceiver 1415, the terminal "2" is coupled to a first port of the second filter 1445, and the terminal "3" is coupled to the terminal "3" of the second switching device 1450. The first and second filters 1440 and 1445 may include respective second ports coupled together, and to the terminal "2" of the second switching device 1450. In this configuration, the second filter 1445 may be selectively coupled between the third transceiver 1415 and a first input/output port ($S_{13}$) when the first and second switching devices 1435 and 1450 are operated to couple their respective terminal "1" to their respective terminal "2" (non-bypass mode); or the second filter 1445 may be bypassed when the first and second switching devices 1435 and 1450 are operated to couple their respective terminal "1" to their respective terminal "3" (bypass mode).

The second switched diplexer 1460 includes a third switching device 1465, a third filter 1470, a fourth filter 1475, and a fourth switching device 1480. Similarly, the third switching device 1465 may be implemented as a SPDT switch including terminals "1", "2", and "3". The fourth switching device 1480 may also be implemented as a SPDT switch including terminals "1", "2", and "3". The third filter 1470 includes a first port coupled to the second transceiver 1410.

With regard to the third switching device 1465, the terminal "1" is coupled to the fourth transceiver 1420, the terminal "2" is coupled to a first port of the fourth filter 1475, and the terminal "3" is coupled to the terminal "3" of the fourth switching device 1480. The third and fourth filters 1470 and 1475 may include respective second ports coupled together, and to the terminal "2" of the fourth switching device 1480. In this configuration, the fourth filter 1475 may be selectively coupled between the fourth transceiver 1420 and a second input/output port ($S_{24}$) when the third and fourth switching devices 1465 and 1480 are operated to couple their respective terminal "1" to their respective terminal "2" (non-bypass mode); or the fourth filter 1475 may be bypassed when the third and fourth switching devices 1465 and 1480 are operated to couple their respective terminal "1" to their respective terminal "3" (bypass mode).

The first transceiver 1405 includes circuitry configured to generate a first radio frequency (RF) signal $S_{RF1}$ based on a first baseband (BB) signal $S_{BB1}$. The second transceiver 1410 includes circuitry configured to generate a second RF signal $S_{RF2}$ based on a second BB signal $S_{BB2}$ The third transceiver 1415 includes circuitry configured to generate a third RF signal $S_{RF3}$ based on a third BB signal $S_{BB3}$ The fourth transceiver 1420 includes circuitry configured to generate a fourth RF signal $S_{RF4}$ based on a fourth BB signal $S_{BB4}$ Although these transceivers have been described with regard to transmission mode, it shall be understood that the transceivers may operate in reception mode.

The first transceiver 1405 may be configured to generate the first RF signal $S_{RF1}$ in a first band (e.g., 2.4 GHz) or a second band (e.g., 5 or 5/6 GHz). The second transceiver 1410 may be configured to generate the second RF signal $S_{RF2}$ in the first band or the second band. With regard to the second band, the first and second transceivers 1405 and 1410 may be configured to generate the first and second RF signals $S_{RF1}$ and $S_{RF2}$ in a particular sub-band (e.g., UNII-2C to -5 or -8, or UNII-5 to -8), respectively. The third and fourth transceivers 1415 and 1420 may be configured to generate the third and fourth RF signals $S_{RF3}$ and $S_{RF4}$ in the second band (e.g., 5 or 5/6 GHz or UNII-1 to -5 or -8).

The first and third filters 1440 and 1470 may have a passband (e.g., IL≤1 or 2 dB) in a first sub-band (e.g., UNII-2C to -5 or -8, or UNII-5 to -8) of the second band (e.g., 5 or 5/6 GHz), and a reject band (e.g., IL≥45 dB) in a second sub-band (e.g., UNII-1 to -2A or -2C) of the second band. The second and fourth filters 1445 and 1475 may have a passband (e.g., IL≤1 or 2 dB) in the second sub-band of the second band, and a reject band (e.g., IL≥45 dB) in the first sub-band of the second band.

The first and/or second filter 1440 and 1445 are configured to filter the first and/or third RF signals $S_{RF1}$ and/or $S_{RF3}$ to generate transmit signal $S_{13}$ if the first and second switching devices 1435 and 1450 are in their non-bypass configuration. If the first and second switching devices 1435 and 1450 are in their bypass configuration, which may occur when the front-end 1400 is operated in DB S mode, the third transceiver 1415 may be operated to generate the RF signal $S_{RF3}$ with a relatively wide operating band (e.g., UNII-1 to -5 or -8) and provided to the first input/output port ($S_{13}$) without going through the second filter 1445. In such bypass mode, an optional low selectivity RF filter may be included to suppress transmitter out-of-band emissions when the third transceiver 1415 is transmitting and to prevent blocking signals transmitted in other bands from adversely affecting the receiver of the third transceiver 1415.

Similarly, the third and/or fourth filter 1470 and 1475 are configured to filter the second and/or fourth RF signals $S_{RF2}$ and/or $S_{RF4}$ to generate transmit signal $S_{24}$ if the third and fourth switching devices 1465 and 1480 are in their non-bypass configuration. If the third and fourth switching devices 1465 and 1480 are in their bypass configuration, which may occur when the front-end 1400 is operated in DBS mode, the fourth transceiver 1420 may be operated to generate the RF signal $S_{RF4}$ with a relatively wide operating band (e.g., UNII-1 to -5 or -8) and provided to the second input/output port ($S_{24}$) without going through the fourth filter 1475. In such bypass mode, an optional low selectivity RF filter may be included to suppress transmitter out-of-band emissions when the fourth transceiver 1420 is transmitting and to prevent blocking signals transmitted in other bands from adversely affecting the receiver of the fourth transceiver 1420.

Figure 15:
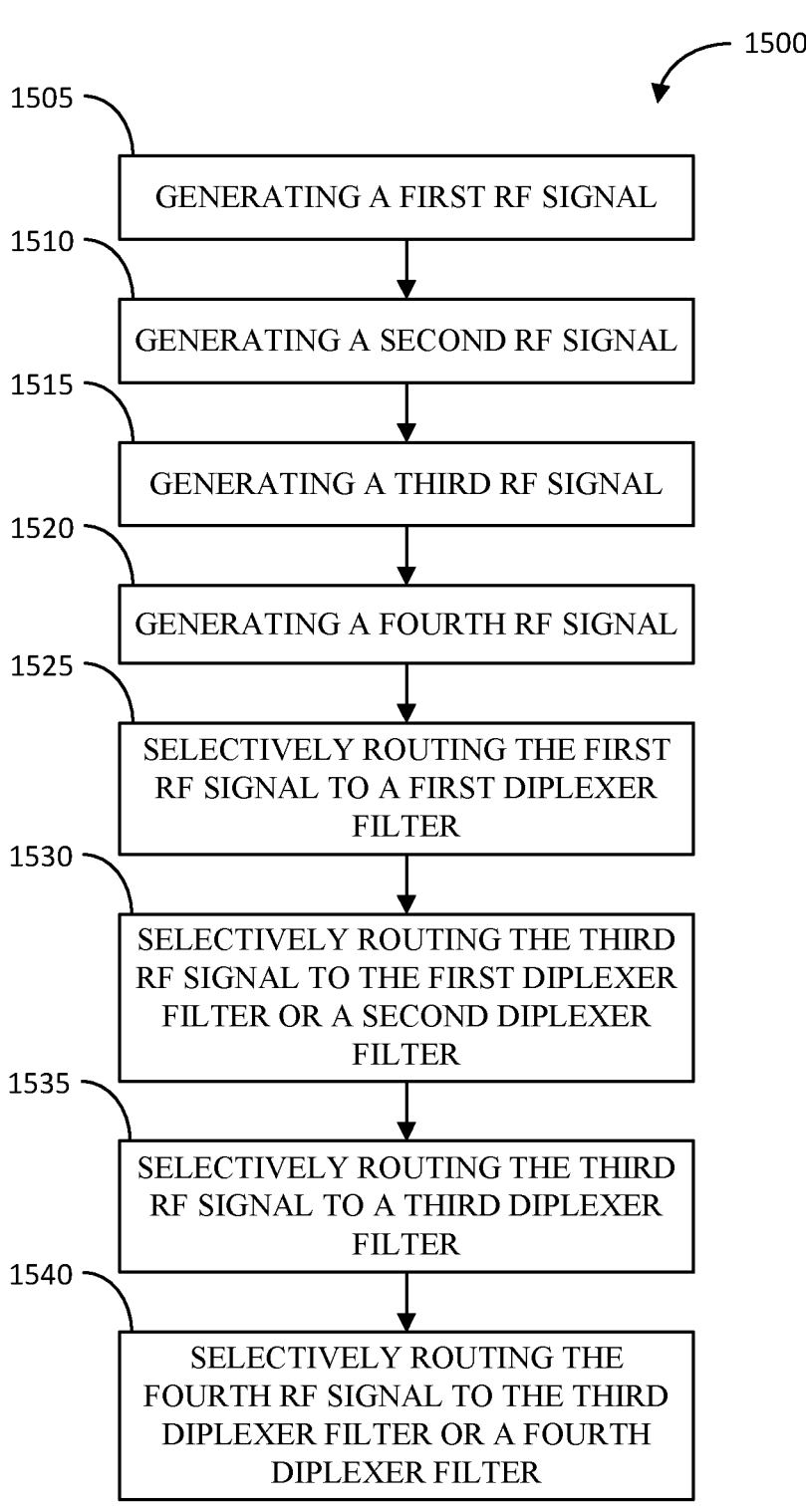
FIG. 15 illustrates a flow diagram of an example a method of operating a radio frequency (RF) front end in accordance with another aspect of the disclosure.

FIG. 15 illustrates a flow diagram of an example a method 1500 of operating a radio frequency (RF) front end in accordance with another aspect of the disclosure. The method 1500 includes generating a first RF signal (block 1505). Examples of means for generating a first RF signal include transceivers 612, 712, 1112, and 1212. The method 1500 further includes generating a second RF signal (block 1510). Examples of means for generating a second RF signal include transceivers 614, 714, 1114, and 1214.

Additionally, the method 1500 further includes generating a third RF signal (block 1515). Examples of means for generating a third RF signal include transceivers 616, 716, 1116, and 1216. Further, the method 1500 includes generating a fourth RF signal (block 1520). Examples of means for generating a fourth RF signal include transceivers 618, 718, 1118, and 1218.

The method 1500 also includes selectively routing the first RF signal to a first diplexer filter (block 1525). Examples of means for selectively routing the first RF signal to a first diplexer filter include half DPDT switch 622, full DPDT switch 722, the half DPDT switch of the switched diplexer 1134, and the full DPDT switch of the switched diplexer 1234. Also, the method 1500 includes selectively routing the third RF signal to the first diplexer filter or a second diplexer filter (block 1530). Examples of means for selectively routing the third RF signal to the first diplexer filter or a second diplexer filter include half DPDT switch 622, full DPDT switch 722, the half DPDT switch of the switched diplexer 1134, and the full DPDT switch of the switched diplexer 1234.

Further, the method 1500 also includes selectively routing the third RF signal to a third diplexer filter (block 1535). Examples of means for selectively routing the third RF signal to a third diplexer filter include half DPDT switch 632, full DPDT switch 732, the half DPDT switch of the switched diplexer 1136, and the full DPDT switch of the switched diplexer 1236. Also, the method 1500 includes selectively routing the fourth RF signal to the third diplexer filter or a fourth diplexer filter (block 1540). Examples of means for selectively routing the fourth RF signal to the third diplexer filter or a fourth diplexer filter include half DPDT switch 632, full DPDT switch 732, the half DPDT switch of the switched diplexer 1136, and the full DPDT switch of the switched diplexer 1236.

The method 1500 may further include routing the first RF signal filtered by the first diplexer filter to a fifth diplexer filter. Examples of means for routing the first RF signal filtered by the first diplexer filter to a fifth diplexer filter include the couplings of filters 624, 724, upper filter of the switched diplexer 1134, and upper filter of the switched diplexer 1234 to diplexer filters 654, 754, lower input of diplexer 1138, and lower input of diplexer 1238, respectively.

The method 1500 may also include routing the third RF signal filtered by the second diplexer filter to the fifth diplexer filter. Examples of means for routing the third RF signal filtered by the second diplexer filter to the fifth diplexer filter include the couplings of filters 626, 726, lower filter of the switched diplexer 1134, and lower filter of the switched diplexer 1234 to diplexer filters 654, 754, lower input of diplexer 1138, and lower input of diplexer 1238, respectively.

The method 1500 may further include routing the second RF signal filtered by the third diplexer filter to a sixth diplexer filter. Examples of means for routing the second RF signal filtered by the third diplexer filter to a sixth diplexer filter include the couplings of filters 634, 734, upper filter of the switched diplexer 1136, and upper filter of the switched diplexer 1236 to diplexer filters 664, 764, lower input of diplexer 1140, and lower input of diplexer 1240, respectively.

The method 1500 may further include routing the fourth RF signal filtered by the fourth diplexer filter to the sixth diplexer filter. Examples of means for routing the fourth RF signal filtered by the fourth diplexer filter to the sixth diplexer filter include the couplings of filters 636, 736, lower filter of the switched diplexer 1136, and lower filter of the switched diplexer 1236 to diplexer filters 664, 764, lower input of diplexer 1140, and lower input of diplexer 1240, respectively.

The first and third diplexer filters each have a first passband within a first sub-band (e.g., one of UNII-1 to UNII-8) of a band (e.g., 5 and/or 6 GHz band); and the second and fourth diplexer filters each have a second passband within a second sub-band (e.g., another one of UNII-1 to UNII-8) of the band, the first sub-band not overlapping in frequency with the second sub-band.

The following provides an overview of aspects of the present disclosure:

Aspect 1: The apparatus includes a first xPlexer including first and second filters, wherein the first xPlexer is configured to be coupled to a first antenna; a second xPlexer including third and fourth filters, wherein the second xPlexer is configured to be coupled to a second antenna; a first switched xPlexer including fifth and sixth filters coupled to the second filter of the first xPlexer; a second switched xPlexer including seventh and eighth filters coupled to the fourth filter of the second xPlexer; a first transceiver coupled to the first filter of the first xPlexer and selectively coupled to the fifth filter of the first switched xPlexer; a second transceiver coupled to the third filter of the second xPlexer and selectively coupled to the seventh filter of the second switched xPlexer; a third transceiver selectively coupled to either the fifth or sixth filter of the first switched xPlexer; and a fourth transceiver selectively coupled to the seventh or eighth filter of the second switched xPlexer.

Aspect 2: The apparatus of aspect 1, wherein, in a mode of operation, the first and second transceivers are configured to generate first and second radio frequency (RF) signals in a first band, respectively, and the third and fourth transceivers are configured to generate third and fourth RF signals in a second band, respectively.

Aspect 3: The apparatus of aspect 2, wherein the mode of operation corresponds to a dual band simultaneous (DBS) mode of operation.

Aspect 4: The apparatus of aspect 2 or 3, wherein the first band extends from substantially 2400 megaHertz (MHz) to 2483.5 MHz, and the second band extends from substantially 5150 MHz to 5925 MHz.

Aspect 5: The apparatus of aspect 2 or 3, wherein the first band extends from substantially 2400 MHz to 2483.5 MHz, and the second band extends from substantially 5150 MHz to 7125 MHz.

Aspect 6: The apparatus of any one of aspects 2-5, wherein the first, second, third, and fourth RF signals are wireless local area network (WLAN) signals.

Aspect 7: The apparatus of any one of aspects 2-6, wherein: the first filter of the first xPlexer is configured to filter the first RF signal; the third filter of the second xPlexer is configured to filter the second RF signal; the fifth filter of the first switched xPlexer is configured to filter the third RF signal; and the seventh filter of the second switched xPlexer is configured to filter the fourth RF signal.

Aspect 8: The apparatus of aspect 7, wherein: the first switched xPlexer comprises a first half double pole double throw (DPDT) switch including first and second poles and first and second throws, wherein the first and second poles are coupled to the first and third transceivers, respectively, wherein the first and second throws are coupled to the fifth and sixth filters, respectively, and wherein the first half DPDT switch is configured such that the second pole is coupled to the first throw, and the first pole is not coupled to the first and second throws; and the second switched xPlexer comprises a second half DPDT switch including third and fourth poles and third and fourth throws, wherein the third and fourth poles are coupled to the second and fourth transceivers, respectively, wherein the third and fourth throws are coupled to the seventh and eighth filters, respectively, and wherein the second half DPDT switch is configured such that the fourth pole is coupled to the third throw, and the third pole is not coupled to the third and fourth throws.

Aspect 9: The apparatus of aspect 7, wherein: the first switched xPlexer comprises a first double pole double throw (DPDT) switch including first and second poles and first and second throws, wherein the first and second poles are coupled to the first and third transceivers, respectively, wherein the first and second throws are coupled to the fifth and sixth filters, respectively, and wherein the first DPDT switch is configured such that the second pole is coupled to the first throw, and the first pole is coupled to the second throw; and the second switched xPlexer comprises a second DPDT switch including third and fourth poles and third and fourth throws, wherein the third and fourth poles are coupled to the second and fourth transceivers, respectively, wherein the third and fourth throws are coupled to the seventh and eighth filters, respectively, and wherein the second DPDT switch is configured such that the fourth pole is coupled to the third throw, and the third pole is coupled to the fourth throw.

Aspect 10: The apparatus of aspect 9, wherein the first and second transceivers are configured to receive Licensed-Assisted Access (LAA) RF signals by way of the second and fourth throws of the first and second DPDT switches when the mode of operation is on standby, respectively.

Aspect 11: The apparatus of any one of aspects 2-6, wherein: the first filter of the first xPlexer is configured to filter the first RF signal; the third filter of the second xPlexer is configured to filter the second RF signal; the sixth filter of the first switched xPlexer is configured to filter the third RF signal; and the eighth filter of the second switched xPlexer is configured to filter the fourth RF signal.

Aspect 12: The apparatus of aspect 11, wherein: the first switched xPlexer comprises a first half double pole double throw (DPDT) switch including first and second poles and first and second throws, wherein the first and second poles are coupled to the first and third transceivers, respectively, wherein the first and second throws are coupled to the fifth and sixth filters, respectively, and wherein the first half DPDT switch is configured such that the second pole is coupled to the second throw; and the second switched xPlexer comprises a second half DPDT switch including third and fourth poles and third and fourth throws, wherein the third and fourth poles are coupled to the second and fourth transceivers, respectively, wherein the third and fourth throws are coupled to the seventh and eighth filters, respectively, and wherein the second half DPDT switch is configured such that the fourth pole is coupled to the fourth throw.

Aspect 13: The apparatus of aspect 11, wherein: the first switched xPlexer comprises a first double pole double throw (DPDT) switch including first and second poles and first and second throws, wherein the first and second poles are coupled to the first and third transceivers, respectively, wherein the first and second throws are coupled to the fifth and sixth filters, respectively, and wherein the first DPDT switch is configured such that the first pole is coupled to the first throw, and the second pole is coupled to the second throw; and the second switched xPlexer comprises a second DPDT switch including third and fourth poles and third and fourth throws, wherein the third and fourth poles are coupled to the second and fourth transceivers, respectively, wherein the third and fourth throws are coupled to the seventh and eighth filters, respectively, and wherein the second DPDT switch is configured such that the third pole is coupled to the third throw, and the fourth pole is coupled to the fourth throw.

Aspect 14: The apparatus of aspect 13, wherein the first and second transceivers are configured to receive Licensed-Assisted Access (LAA) RF signals by way of the first and third throws of the first and second DPDT switches when the mode of operation is on standby, respectively.

Aspect 15: The apparatus of aspect 1, wherein, in a mode of operation, the first and second transceivers are configured to generate first and second radio frequency (RF) signals in a first sub-band of a band, respectively, and the third and fourth transceivers are configured to generate third and fourth RF signals in a second sub-band of the band, respectively.

Aspect 16: The apparatus of aspect 15, wherein the mode of operation is single band simultaneous (SBS).

Aspect 17: The apparatus of aspect 15 or 16, wherein the first sub-band is one of Unlicensed National Information Infrastructure (UNII)-1 or -2A, and wherein the second sub-band is one of UNII-2C to -8.

Aspect 18: The apparatus of aspect 15 or 16, wherein the first sub-band is one of Unlicensed National Information Infrastructure (UNII)-1 to -3, and wherein the second sub-band is one of UNII-5 to -8.

Aspect 19: The apparatus of any one of aspects 15-18, wherein: the second filter of the first xPlexer is configured to filter the first and third RF signals; the fourth filter of the second xPlexer is configured to filter the second and fourth RF signals; the fifth filter of the first switched xPlexer is configured to filter the first RF signal; the sixth filter of the first switched xPlexer is configured to filter the third RF signal; the seventh filter of the second switched xPlexer is configured to filter the second RF signal; and the eighth filter of the second switched xPlexer is configured to filter the fourth RF signal.

Aspect 20: The apparatus of aspect 19, wherein: the first switched xPlexer comprises a first half double pole double throw (DPDT) switch including first and second poles and first and second throws, wherein the first and second poles are coupled to the first and third transceivers, respectively, wherein the first and second throws are coupled to the fifth and sixth filters, respectively, and wherein the first half DPDT switch is configured such that the first pole is coupled to the first throw, and the second pole is coupled to the second throw; and the second switched xPlexer comprises a second half DPDT switch including third and fourth poles and third and fourth throws, wherein the third and fourth poles are coupled to the second and fourth transceivers, respectively, wherein the third and fourth throws are coupled to the seventh and eighth filters, respectively, and wherein the second half DPDT switch is configured such that the third pole is coupled to the third throw, and the fourth pole is coupled to the fourth throw.

Aspect 21: The apparatus of aspect 19, wherein: the first switched xPlexer comprises a first double pole double throw (DPDT) switch including first and second poles and first and second throws, wherein the first and second poles are coupled to the first and third transceivers, respectively, wherein the first and second throws are coupled to the fifth and sixth filters, respectively, and wherein the first DPDT switch is configured such that the first pole is coupled to the first throw, and the second pole is coupled to the second throw; and the second switched xPlexer comprises a second DPDT switch including third and fourth poles and third and fourth throws, wherein the third and fourth poles are coupled to the second and fourth transceivers, respectively, wherein the third and fourth throws are coupled to the seventh and eighth filters, respectively, and wherein the second DPDT switch is configured such that the third pole is coupled to the third throw, and the fourth pole is coupled to the fourth throw.

Aspect 22: The apparatus of aspect 21, wherein the third and fourth transceivers are configured to receive Licensed-Assisted Access (LAA) RF signals by way of the second and fourth throws of the first and second DPDT switches when the mode of operation is on standby, respectively.

Aspect 23: The apparatus of any one of aspects 15-22, wherein the mode of operation is synchronous multi-link operation (MLO), and wherein: the first and second RF signals comprise first and second RF MIMO signals to form a first pair of spatial streams from the first and second antennas to a remote wireless communication device, respectively; and the third and fourth RF signals comprise third and fourth RF MIMO signals, and in synchronous with the first and second transceivers generating the first and second RF MIMO signals, the third and fourth transceivers are configured to generate the third and fourth RF MIMO signals to form a second pair of spatial streams from the first and second antennas to the remote wireless communication device, respectively.

Aspect 24: The apparatus of aspect 1, wherein, in an asynchronous multi-link operation (MLO), the first and second transceivers are configured to generate first and second transmit (Tx) radio frequency (RF) multiple-input-multiple-output (MIMO) signals in a first sub-band of a band, respectively, and the third and fourth transceivers are configured to generate transmit (Tx) or process received (Rx) third and fourth RF MIMO signals in a second sub-band of the band asynchronous with the first and second transceivers generating the first and second Tx RF MIMO signals, respectively.

Aspect 25: The apparatus of aspect 1, wherein the first transceiver includes circuitry configured to generate radio frequency signals in either a first band or a second band, wherein the second transceiver includes circuitry configured to generate radio frequency signals in either the first band or the second band, wherein the third transceiver includes circuitry configured to generate radio frequency signals in the second band, wherein the fourth transceiver includes circuitry configured to generate radio frequency signals in the second band.

Aspect 26: The apparatus of aspect 25, wherein the first band extends from substantially 2400 MHz to 2483.5 MHz, and the second band is above 5000 MHz.

Aspect 27: The apparatus of aspect 25 or 26, wherein the first and third filters each have a passband associated with the first band, wherein the second and fourth filters each have a passband associated with the second band.

Aspect 28: The apparatus of any one of aspects 25 to 27, wherein the fifth and seventh filters have passbands associated with a first sub-band of the second band, and wherein the sixth and eighth filter have passbands associated with a second sub-band of the second band.

Aspect 29: The apparatus of any one of aspects 1-28, wherein the first and third filters each have a passband associated with a first band, wherein the second and fourth filters each have a passband associated with a second band.

Aspect 30: The apparatus of aspect 29, wherein the fifth and seventh filters have passbands associated with a first sub-band of the second band, and wherein the sixth and eighth filter have passbands associated with a second sub-band of the second band.

Aspect 31: The apparatus of any of aspects 29 and 30, wherein the first band extends from substantially 2400 MHz to 2483.5 MHz, and the second band is above 5000 MHz.

Aspect 32: The apparatus of aspect 1, wherein the first switched xPlexer includes a first half double pole double throw (DPDT) switch including first and second poles and first and second throws, wherein the first and second poles are coupled to the first and third transceivers, respectively, wherein the first and second throws are coupled to the fifth and sixth filters, respectively.

Aspect 33: The apparatus of aspect 32, wherein the second switched xPlexer includes a second half double pole double throw (DPDT) switch including first and second poles and first and second throws, wherein the first and second poles are coupled to the second and fourth transceivers, respectively, wherein the first and second throws are coupled to the seventh and eighth filters, respectively.

Aspect 34: The apparatus of aspect 1, wherein the first switched xPlexer includes a first double pole double throw (DPDT) switch including first and second poles and first and second throws, wherein the first and second poles are coupled to the first and third transceivers, respectively, wherein the first and second throws are coupled to the fifth and sixth filters, respectively.

Aspect 35: The apparatus of aspect 34, wherein the second switched xPlexer includes a second double pole double throw (DPDT) switch including first and second poles and first and second throws, wherein the first and second poles are coupled to the second and fourth transceivers, respectively, wherein the first and second throws are coupled to the seventh and eighth filters, respectively.

Aspect 36: An apparatus, comprising: a first switched diplexer including a first filter and a second filter; a second switched diplexer including a third filter and a fourth filter; a first transceiver selectively coupled to the first filter of the first switched diplexer; a second transceiver selectively coupled to the third filter of the second switched diplexer; a third transceiver selectively coupled to either the first filter or the second filter of the first switched diplexer; and a fourth transceiver selectively coupled to the third filter or the fourth filter of the second switched diplexer.

Aspect 37: The apparatus of aspect 36, wherein the first transceiver includes circuitry configured to generate radio frequency signals in either a first band or a second band, wherein the second transceiver includes circuitry configured to generate radio frequency signals in either the first band or the second band, wherein the third transceiver includes circuitry configured to generate radio frequency signals in the second band, wherein the fourth transceiver includes circuitry configured to generate radio frequency signals in the second band.

Aspect 38: The apparatus of aspect 37, wherein the first band extends from substantially 2400 MHz to 2483.5 MHz, and the second band is above 5000 MHz.

Aspect 39: The apparatus of aspect 37 or 38, wherein the first filter and the third filter have passbands associated with a first sub-band of the second band, and wherein the second filter and the fourth filter have passbands associated with a second sub-band of the second band.

Aspect 40: The apparatus of any of aspects 36 to 39, wherein the first switched diplexer includes a first half double pole double throw (DPDT) switch including first and second poles and first and second throws, wherein the first and second poles are coupled to the first and third transceivers, respectively, wherein the first and second throws are coupled to the first filter and the second filter, respectively.

Aspect 41: The apparatus of aspect 40, wherein the second switched diplexer includes a second half double pole double throw (DPDT) switch including first and second poles and first and second throws, wherein the first and second poles are coupled to the second and fourth transceivers, respectively, wherein the first and second throws are coupled to the third filter and the fourth filter, respectively.

Aspect 42: The apparatus of any one of aspects 36 to 39, wherein the first switched diplexer includes a first double pole double throw (DPDT) switch including first and second poles and first and second throws, wherein the first and second poles are coupled to the first and third transceivers, respectively, wherein the first and second throws are coupled to the first filter and the second filter, respectively.

Aspect 43: The apparatus of aspect 42, wherein the second switched diplexer includes a second double pole double throw (DPDT) switch including first and second poles and first and second throws, wherein the first and second poles are coupled to the second and fourth transceivers, respectively, wherein the first and second throws are coupled to the third filter and the fourth filter, respectively.

Aspect 44: The apparatus of any one of aspects 36 to 43, further comprising a first xPlexer including a fifth filter and a sixth filter, the first switched diplexer coupled to the sixth filter of the first xPlexer.

Aspect 45: The apparatus of aspect 44, further comprising a second xPlexer including a seventh filter and an eighth filter, the second switched diplexer coupled to the eighth filter of the second xPlexer, wherein the fifth filter and the seventh filter each have a passband associated with the first band, wherein the sixth filter and the eighth filter each have a passband associated with the second band.

Aspect 46: The apparatus of any one of aspects 37 to 45, wherein the first band extends from substantially 2400 MHz to 2483.5 MHz, and the second band extends from substantially 5150 MHz to 7125 MHz.

Aspect 47: The apparatus of any one of aspects 36-46, wherein, in a mode of operation, the first and second transceivers are configured to generate first and second radio frequency (RF) signals in a first band, respectively, and the third and fourth transceivers are configured to generate third and fourth RF signals in a second band, respectively.

Aspect 48: The apparatus of aspect 47, wherein the first, second, third, and fourth RF signals are wireless local area network (WLAN) signals.

Aspect 49: The apparatus of any one of aspects 39 to 48, wherein the first sub-band is one of Unlicensed National Information Infrastructure (UNII)-1 or -2A, and wherein the second sub-band is one of UNII-2C to -8.

Aspect 50: The apparatus any one of aspects 39 to 48, wherein the first sub-band is one of Unlicensed National Information Infrastructure (UNII)-1 to -3, and wherein the second sub-band is one of UNII-5 to -8.

Aspect 51: The apparatus of any one of aspects 36-50, wherein the first switched diplexer is coupled between the first and third transceivers and an antenna.

Aspect 52: The apparatus of any one of aspects 36-51, further comprising an xPlexer coupled between the first switched diplexer and the antenna, the xPlexer comprising two or more filters.

Aspect 53: A method of operating a radio frequency (RF) front end, comprising: generating a first RF signal; generating a second RF signal; generating a third RF signal; generating a fourth RF signal; selectively routing the first RF signal to a first diplexer filter; selectively routing the third RF signal to the first diplexer filter or a second diplexer filter; selectively routing the third RF signal to a third diplexer filter; and selectively routing the fourth RF signal to the third diplexer filter or a fourth diplexer filter.

Aspect 54: The method of aspect 53, further comprising: routing the first RF signal filtered by the first diplexer filter to a fifth diplexer filter; routing the third RF signal filtered by the second diplexer filter to the fifth diplexer filter; routing the second RF signal filtered by the third diplexer filter to a sixth diplexer filter; and routing the fourth RF signal filtered by the fourth diplexer filter to the sixth diplexer filter.

Aspect 55: The method of aspect 54 or 55, wherein: the first and third diplexer filters each have a first passband within a first sub-band of a band; and the second and fourth diplexer filters each have a second passband within a second sub-band of the band, the first sub-band not overlapping in frequency with the second sub-band.

Aspect 56: The apparatus of aspect 1, wherein: the first switched xPlexer includes a first single pole double throw (SPDT) switch having a first terminal coupled to the third transceiver and a second single pole double throw (SPDT) switch having a first terminal coupled to the second filter, the sixth filter coupled between a second terminal of the first single pole double throw (SPDT) switch and a second terminal of the second single pole double throw (SPDT) switch, a first bypass path coupled between a third terminal of the first single pole double throw (SPDT) switch and a third terminal of the second single pole double throw (SPDT) switch; and wherein the second switched xPlexer includes a third single pole double throw (SPDT) switch having a first terminal coupled to the fourth transceiver and a fourth single pole double throw (SPDT) switch having a first terminal coupled to the fourth filter, the eighth filter coupled between a second terminal of the third single pole double throw (SPDT) switch and a second terminal of the fourth single pole double throw (SPDT) switch, a second bypass path coupled between a third terminal of the third single pole double throw (SPDT) switch and a third terminal of the fourth single pole double throw (SPDT) switch.

Aspect 57: The apparatus of aspect 36, wherein: the first switched diplexer includes a first single pole double throw (SPDT) switch having a first terminal coupled to the third transceiver and a second single pole double throw (SPDT) switch having a first terminal coupled to a first output, the second filter coupled between a second terminal of the first single pole double throw (SPDT) switch and a second terminal of the second single pole double throw (SPDT) switch, a first bypass path coupled between a third terminal of the first single pole double throw (SPDT) switch and a third terminal of the second single pole double throw (SPDT) switch; and wherein the second switched diplexer includes a third single pole double throw (SPDT) switch having a first terminal coupled to the fourth transceiver and a fourth single pole double throw (SPDT) switch having a first terminal coupled to a second output, the fourth filter coupled between a second terminal of the third single pole double throw (SPDT) switch and a second terminal of the fourth single pole double throw (SPDT) switch, a second bypass path coupled between a third terminal of the third single pole double throw (SPDT) switch and a third terminal of the fourth single pole double throw (SPDT) switch.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed:

1. An apparatus, comprising:
a first xPlexer including first and second filters, wherein the first xPlexer is configured to be coupled to a first antenna;
a second xPlexer including third and fourth filters, wherein the second xPlexer is configured to be coupled to a second antenna;

a first switched xPlexer including a first switching device and fifth and sixth filters coupled to the second filter of the first xPlexer;
a second switched xPlexer including a second switching device and seventh and eighth filters coupled to the fourth filter of the second xPlexer;
a first transceiver coupled to the first filter of the first xPlexer and to the first switching device, the first switching device configured to selectively couple the first transceiver to the fifth filter of the first switched xPlexer;
a second transceiver coupled to the third filter of the second xPlexer and to the second switching device, the second switching device configured to selectively coupled couple the second transceiver to the seventh filter of the second switched xPlexer;
a third transceiver coupled to the first switching device, the first switching device further configured to selectively switch between coupling the third transceiver to the fifth filter and coupling the third transceiver to the sixth filter of the first switched xPlexer; and
a fourth transceiver coupled to the second switching device, the second switching device further configured to selectively switch between coupling the fourth transceiver to the seventh filter and coupling the fourth transceiver to the eighth filter of the second switched xPlexer.

2. The apparatus of claim 1, wherein:
the first switching device includes a first half double pole double throw (DPDT) switch including first and second poles and first and second throws, wherein the first and second poles are coupled to the first and third transceivers, respectively, wherein the first and second throws are coupled to the fifth and sixth filters, respectively; and
wherein the second switching device includes a second half double pole double throw (DPDT) switch including first and second poles and first and second throws, wherein the first and second poles are coupled to the second and fourth transceivers, respectively, wherein the first and second throws are coupled to the seventh and eighth filters, respectively.

3. The apparatus of claim 1, wherein, in a mode of operation, the first and second transceivers are configured to generate first and second radio frequency (RF) signals in a first band, respectively, and the third and fourth transceivers are configured to generate third and fourth RF signals in a second band, respectively.

4. The apparatus of claim 3, wherein the mode of operation corresponds to a dual band simultaneous (DBS) mode of operation.

5. The apparatus of claim 3, wherein:
the first filter of the first xPlexer is configured to filter the first RF signal;
the third filter of the second xPlexer is configured to filter the second RF signal;
the fifth filter of the first switched xPlexer is configured to filter the third RF signal; and
the seventh filter of the second switched xPlexer is configured to filter the fourth RF signal.

6. The apparatus of claim 5, wherein:
the first switching device comprises a first half double pole double throw (DPDT) switch including first and second poles and first and second throws, wherein the first and second poles are coupled to the first and third transceivers, respectively, wherein the first and second throws are coupled to the fifth and sixth filters, respectively, and wherein the first half DPDT switch is configured such that the second pole is coupled to the first throw, and the first pole is not coupled to the first and second throws; and the second switching device comprises a second half DPDT switch including third and fourth poles and third and fourth throws, wherein the third and fourth poles are coupled to the second and fourth transceivers, respectively, wherein the third and fourth throws are coupled to the seventh and eighth filters, respectively, and wherein the second half DPDT switch is configured such that the fourth pole is coupled to the third throw, and the third pole is not coupled to the third and fourth throws.

7. The apparatus of claim 5, wherein:

the first switching device comprises a first double pole double throw (DPDT) switch including first and second poles and first and second throws, wherein the first and second poles are coupled to the first and third transceivers, respectively, wherein the first and second throws are coupled to the fifth and sixth filters, respectively, and wherein the first DPDT switch is configured such that the second pole is coupled to the first throw, and the first pole is coupled to the second throw; and the second switching device comprises a second DPDT switch including third and fourth poles and third and fourth throws, wherein the third and fourth poles are coupled to the second and fourth transceivers, respectively, wherein the third and fourth throws are coupled to the seventh and eighth filters, respectively, and wherein the second DPDT switch is configured such that the fourth pole is coupled to the third throw, and the third pole is coupled to the fourth throw.

8. The apparatus of claim 3, wherein:

the first filter of the first xPlexer is configured to filter the first RF signal;

the third filter of the second xPlexer is configured to filter the second RF signal;

the sixth filter of the first switched xPlexer is configured to filter the third RF signal; and the eighth filter of the second switched xPlexer is configured to filter the fourth RF signal.

9. The apparatus of claim 8, wherein:

the first switching device comprises a first half double pole double throw (DPDT) switch including first and second poles and first and second throws, wherein the first and second poles are coupled to the first and third transceivers, respectively, wherein the first and second throws are coupled to the fifth and sixth filters, respectively, and wherein the first half DPDT switch is configured such that the second pole is coupled to the second throw; and the second switching device comprises a second half DPDT switch including third and fourth poles and third and fourth throws, wherein the third and fourth poles are coupled to the second and fourth transceivers, respectively, wherein the third and fourth throws are coupled to the seventh and eighth filters, respectively, and wherein the second half DPDT switch is configured such that the fourth pole is coupled to the fourth throw.

10. The apparatus of claim 8, wherein:

the first switching device comprises a first double pole double throw (DPDT) switch including first and second poles and first and second throws, wherein the first and second poles are coupled to the first and third transceivers, respectively, wherein the first and second throws are coupled to the fifth and sixth filters, respectively, and wherein the first DPDT switch is configured such that the first pole is coupled to the first throw, and the second pole is coupled to the second throw; and the second switching device comprises a second DPDT switch including third and fourth poles and third and fourth throws, wherein the third and fourth poles are coupled to the second and fourth transceivers, respectively, wherein the third and fourth throws are coupled to the seventh and eighth filters, respectively, and wherein the second DPDT switch is configured such that the third pole is coupled to the third throw, and the fourth pole is coupled to the fourth throw.

11. The apparatus of claim 3, wherein the first band extends from substantially 2400 MHz to 2483.5 MHZ, and the second band is above 5000 MHz.

12. The apparatus of claim 1, wherein, in a mode of operation, the first and second transceivers are configured to generate first and second radio frequency (RF) signals in a first sub-band of a band, respectively, and the third and fourth transceivers are configured to generate third and fourth RF signals in a second sub-band of the band, respectively.

13. The apparatus of claim 12, wherein the mode of operation is single band simultaneous (SBS).

14. The apparatus of claim 12, wherein:

the second filter of the first xPlexer is configured to filter the first and third RF signals;

the fourth filter of the second xPlexer is configured to filter the second and fourth RF signals;

the fifth filter of the first switched xPlexer is configured to filter the first RF signal;

the sixth filter of the first switched xPlexer is configured to filter the third RF signal;

the seventh filter of the second switched xPlexer is configured to filter the second RF signal; and the eighth filter of the second switched xPlexer is configured to filter the fourth RF signal.

15. The apparatus of claim 14, wherein:

the first switching device comprises a first half double pole double throw (DPDT) switch or a first DPDT switch, wherein the first half DPDT switch or the first DPDT switch includes first and second poles and first and second throws, wherein the first and second poles are coupled to the first and third transceivers, respectively, wherein the first and second throws are coupled to the fifth and sixth filters, respectively, and wherein the first half DPDT switch or the first DPDT switch is configured such that the first pole is coupled to the first throw, and the second pole is coupled to the second throw; and the second switching device comprises a second half DPDT switch or a second DPDT switch, wherein the second half DPDT switch or the second DPDT switch includes third and fourth poles and third and fourth throws, wherein the third and fourth poles are coupled to the second and fourth transceivers, respectively, wherein the third and fourth throws are coupled to the seventh and eighth filters, respectively, and wherein the second half DPDT switch or the second DPDT switch is configured such that the third pole is coupled to the third throw, and the fourth pole is coupled to the fourth throw.

16. The apparatus of claim 12, wherein the mode of operation is synchronous multi-link operation (MLO), and wherein:

the first and second RF signals comprise first and second RF MIMO signals to form a first pair of spatial streams from the first and second antennas to a remote wireless communication device, respectively; and the third and fourth RF signals comprise third and fourth RF MIMO signals, and in synchronous with the first and second transceivers generating the first and second RF MIMO signals, the third and fourth transceivers are configured to generate the third and fourth RF MIMO signals to form a second pair of spatial streams from the first and second antennas to the remote wireless communication device, respectively.

17. The apparatus of claim 1, wherein, in an asynchronous multi-link operation (MLO), the first and second transceivers are configured to generate first and second transmit (Tx) radio frequency (RF) multiple-input-multiple-output (MIMO) signals in a first sub-band of a band, respectively, and the third and fourth transceivers are configured to generate transmit (Tx) or process received (Rx) third and fourth RF MIMO signals in a second sub-band of the band asynchronous with the first and second transceivers generating the first and second Tx RF MIMO signals, respectively.

18. The apparatus of claim 1, wherein:

the first switching device includes a first double pole double throw (DPDT) switch including first and second poles and first and second throws, wherein the first and second poles are coupled to the first and third transceivers, respectively, wherein the first and second throws are coupled to the fifth and sixth filters, respectively; and the second switching device includes a second double pole double throw (DPDT) switch including first and second poles and first and second throws, wherein the first and second poles are coupled to the second and fourth transceivers, respectively, wherein the first and second throws are coupled to the seventh and eighth filters, respectively.

19. The apparatus of claim 1, wherein the first transceiver includes circuitry configured to generate radio frequency signals in either a first band or a second band, wherein the second transceiver includes circuitry configured to generate radio frequency signals in either the first band or the second band, wherein the third transceiver includes circuitry configured to generate radio frequency signals in the second band, wherein the fourth transceiver includes circuitry configured to generate radio frequency signals in the second band.

20. The apparatus of claim 1, wherein:

the first switching device includes a first single pole double throw (SPDT) switch having a first terminal coupled to the third transceiver and a second single pole double throw (SPDT) switch having a first terminal coupled to the second filter, the sixth filter coupled between a second terminal of the first single pole double throw (SPDT) switch and a second terminal of the second single pole double throw (SPDT) switch, a first bypass path coupled between a third terminal of the first single pole double throw (SPDT) switch and a third terminal of the second single pole double throw (SPDT) switch;

the second switching device includes a third single pole double throw (SPDT) switch having a first terminal coupled to the fourth transceiver and a fourth single pole double throw (SPDT) switch having a first terminal coupled to the fourth filter, the eighth filter coupled between a second terminal of the third single pole double throw (SPDT) switch and a second terminal of the fourth single pole double throw (SPDT) switch, a second bypass path coupled between a third terminal of the third single pole double throw (SPDT) switch and a third terminal of the fourth single pole double throw (SPDT) switch.

21. An apparatus, comprising:

a first switched diplexer including a first switching device and a first filter and a second filter;

a second switched diplexer including a second switching device and a third filter and a fourth filter;

a first transceiver coupled to the first switching device, the first switching device configured to selectively couple the first transceiver to the first filter of the first switched diplexer;

a second transceiver coupled to the second switching device, the second switching device configured to selectively couple the second transceiver to the third filter of the second switched diplexer;

a third transceiver coupled to the first switching device, the first switching device further configured to selectively switch between coupling the third transceiver to the first filter and coupling the third transceiver to the second filter of the first switched diplexer; and a fourth transceiver coupled to the second switching device, the second switching device configured to selectively switch between coupling the fourth transceiver the third filter and coupling the fourth transceiver to the fourth filter of the second switched diplexer.

22. The apparatus of claim 21, wherein the first transceiver includes circuitry configured to generate radio frequency signals in either a first band or a second band, wherein the second transceiver includes circuitry configured to generate radio frequency signals in either the first band or the second band, wherein the third transceiver includes circuitry configured to generate radio frequency signals in the second band, wherein the fourth transceiver includes circuitry configured to generate radio frequency signals in the second band.

23. The apparatus of claim 22, wherein the first band extends from substantially 2400 MHz to 2483.5 MHZ, and the second band is above 5000 MHz.

24. The apparatus of claim 21, wherein:

the first switching device includes a first half double pole double throw (DPDT) switch including first and second poles and first and second throws, wherein the first and second poles are coupled to the first and third transceivers, respectively, wherein the first and second throws are coupled to the first filter and the second filter, respectively; and the second switching device includes a second half double pole double throw (DPDT) switch including first and second poles and first and second throws, wherein the first and second poles are coupled to the second and fourth transceivers, respectively, wherein the first and second throws are coupled to the third filter and the fourth filter, respectively.

25. The apparatus of claim 21, wherein:

the first switching device includes a first double pole double throw (DPDT) switch including first and second poles and first and second throws, wherein the first and second poles are coupled to the first and third transceivers, respectively, wherein the first and second throws are coupled to the first filter and the second filter, respectively; and the second switching device includes a second double pole double throw (DPDT) switch including first and second poles and first and second throws, wherein the first and second poles are coupled to the second and fourth transceivers, respectively, wherein the first and second throws are coupled to the third filter and the fourth filter, respectively.

26. The apparatus of claim 21, further comprising a first xPlexer including a fifth filter and a sixth filter, the first switched diplexer coupled to the sixth filter of the first xPlexer.

27. The apparatus of claim 26, further comprising a second xPlexer including a seventh filter and an eighth filter, the second switched diplexer coupled to the eighth filter of the second xPlexer, wherein the fifth filter and the seventh filter each have a passband associated with a first band, wherein the sixth filter and the eighth filter each have a passband associated with a second band.

28. The apparatus of claim 21, wherein, in a mode of operation, the first and second transceivers are configured to generate first and second radio frequency (RF) signals in a first band, respectively, and the third and fourth transceivers are configured to generate third and fourth RF signals in a second band, respectively.

29. The apparatus of claim 21, wherein:

the first switching device includes a first single pole double throw (SPDT) switch having a first terminal coupled to the third transceiver and a second single pole double throw (SPDT) switch having a first terminal coupled to a first output, the second filter coupled between a second terminal of the first single pole double throw (SPDT) switch and a second terminal of the second single pole double throw (SPDT) switch, a first bypass path coupled between a third terminal of the first single pole double throw (SPDT) switch and a third terminal of the second single pole double throw (SPDT) switch;

the second switching device includes a third single pole double throw (SPDT) switch having a first terminal coupled to the fourth transceiver and a fourth single pole double throw (SPDT) switch having a first terminal coupled to a second output, the fourth filter coupled between a second terminal of the third single pole double throw (SPDT) switch and a second terminal of the fourth single pole double throw (SPDT) switch, a second bypass path coupled between a third terminal of the third single pole double throw (SPDT) switch and a third terminal of the fourth single pole double throw (SPDT) switch.

30. A method of operating a radio frequency (RF) front end, comprising:

generating a first RF signal;

generating a second RF signal;

generating a third RF signal;

generating a fourth RF signal;

selectively routing the first RF signal to a first diplexer filter via a first switching device;

selectively routing the third RF signal to the first diplexer filter or a second diplexer filter via the first switching device that is configured to selectively switch between routing the third RF signal to the first diplexer filter and routing the third RF signal to the second diplexer filter;

selectively routing the second RF signal to a third diplexer filter via a second switching device; and selectively routing the fourth RF signal to the third diplexer filter or a fourth diplexer filter via the second switching device that is configured to selectively switch between routing the fourth RF signal to the third diplexer filter and routing the fourth RF signal to the fourth diplexer filter.

31. The method of claim 30, further comprising:

routing the first RF signal filtered by the first diplexer filter to a fifth diplexer filter;

routing the third RF signal filtered by the second diplexer filter to the fifth diplexer filter;

routing the second RF signal filtered by the third diplexer filter to a sixth diplexer filter; and routing the fourth RF signal filtered by the fourth diplexer filter to the sixth diplexer filter.

32. The method of claim 30, wherein:

the first and third diplexer filters each have a first passband within a first sub-band of a band; and the second and fourth diplexer filters each have a second passband within a second sub-band of the band, the first sub-band not overlapping in frequency with the second sub-band.

* * * * *